US008676208B2

(12) United States Patent
Chou et al.

(10) Patent No.: US 8,676,208 B2
(45) Date of Patent: Mar. 18, 2014

(54) SCANNING AND HANDOVER OPERATION IN MULTI-CARRIER WIRELESS COMMUNICATIONS SYSTEMS

(75) Inventors: Chao-Chin Chou, Taipei (TW); I-Kang Fu, Dashe Township, Kaohsiung County (TW); Yih-Shen Chen, Hsinchu (TW)

(73) Assignee: Mediatek Inc. (TW)

( * ) Notice: Subject to any disclaimer, the term of this patent is extended or adjusted under 35 U.S.C. 154(b) by 195 days.

(21) Appl. No.: 12/456,006

(22) Filed: Jun. 9, 2009

(65) Prior Publication Data
US 2009/0310563 A1 Dec. 17, 2009

Related U.S. Application Data

(60) Provisional application No. 61/060,563, filed on Jun. 11, 2008, provisional application No. 61/078,559, filed on Jul. 7, 2008.

(51) Int. Cl.
*H04W 4/00* (2009.01)
*H04W 36/00* (2009.01)

(52) U.S. Cl.
USPC .......................... 455/437; 455/434; 455/436

(58) Field of Classification Search
USPC ........ 455/434, 435.1, 435.2, 435.3, 436, 437, 455/524, 525
See application file for complete search history.

(56) References Cited

U.S. PATENT DOCUMENTS

| 6,628,630 B1 | 9/2003 | Nagase | 370/331 |
| 7,515,559 B2 | 4/2009 | Koo et al. | 370/328 |
| 7,953,412 B2 | 5/2011 | Lee et al. | 455/436 |
| 8,031,673 B2 | 10/2011 | Craig et al. | 370/331 |
| 8,054,802 B2 | 11/2011 | Burgess et al. | 370/331 |
| 2002/0051432 A1 | 5/2002 | Shin | 370/331 |

(Continued)

FOREIGN PATENT DOCUMENTS

| CN | 1398079 A | 4/1997 |
| CN | 1698390 A | 3/2003 |

(Continued)

OTHER PUBLICATIONS

Kelvin Chou, Mobility Management with Multi-Carrier Support in IEEE 802.16m, Mar. 20, 2008, pp. 1-5.*

(Continued)

*Primary Examiner* — Kent Chang
*Assistant Examiner* — Nelson Rosario
(74) *Attorney, Agent, or Firm* — Imperium Patent Works; Zheng Jin

(57) ABSTRACT

A comprehensive solution is provided for multi-carrier scanning and handover operations in OFDM wireless systems. A multi-carrier scanning is any scanning operation that involves multi-carrier radio frequency carriers. In one embodiment, a mobile station communicates with a serving base station over a primary carrier, and performs scanning over one or more determined carriers. A multi-carrier handover is any handover operation that involves multiple radio frequency carriers. In a first embodiment, a break-before-entry (BBE) handover procedure with fast synchronization is provided. In a second embodiment, an entry-before-break (EBB) handover procedure through unavailable intervals is provided. In a third embodiment, EBB handover procedures for both inter-FA and intra-FA using multiple carriers are provided. Finally, in a fourth embodiment, intra-BS handover procedures are provided. The multi-carrier handover procedures may be applied to 2-to-2 or N-to-N carriers handover situation. The overall scanning time and handover interruption time may be reduced through the provided procedures.

19 Claims, 20 Drawing Sheets

(56) References Cited

U.S. PATENT DOCUMENTS

| | | | |
|---|---|---|---|
| 2003/0129982 A1 | 7/2003 | Perini | 455/442 |
| 2005/0288027 A1 | 12/2005 | Cho et al. | 455/442 |
| 2006/0073836 A1 | 4/2006 | Laroia et al. | 455/437 |
| 2006/0084404 A1* | 4/2006 | Laroia et al. | 455/266 |
| 2007/0054667 A1 | 3/2007 | Lee et al. | 455/434 |
| 2007/0173256 A1 | 7/2007 | Laroia et al. | 455/436 |
| 2007/0258407 A1 | 11/2007 | Li et al. | 370/331 |
| 2008/0039090 A1* | 2/2008 | Jin et al. | 455/436 |
| 2008/0096564 A1 | 4/2008 | Jung et al. | 455/436 |
| 2008/0233961 A1* | 9/2008 | Cho et al. | 455/436 |
| 2009/0109890 A1* | 4/2009 | Chow et al. | 370/312 |
| 2009/0303950 A1 | 12/2009 | Ofuji et al. | 370/329 |
| 2009/0310563 A1 | 12/2009 | Chou et al. | 370/331 |
| 2010/0008328 A1 | 1/2010 | Maheshwari et al. | 370/331 |
| 2010/0284367 A1 | 11/2010 | Koo et al. | 370/331 |
| 2011/0064053 A1 | 3/2011 | Cha et al. | 370/331 |

FOREIGN PATENT DOCUMENTS

| | | | |
|---|---|---|---|
| CN | 1997237 A | | 6/2003 |
| CN | 1832621 A | | 3/2005 |
| CN | 101203034 A | | 12/2006 |
| CN | 101022643 A | | 3/2007 |
| CN | 101345988 A | | 7/2007 |
| EP | 758423 A1 | | 8/2005 |
| EP | 1758423 A1 | | 8/2005 |
| JP | 2008113090 A | | 5/2005 |
| WO | WO2007111415 A1 | | 10/2007 |
| WO | WO2008041650 A1 | | 10/2008 |

OTHER PUBLICATIONS

SIPO—The first examination opinion for patent application 200980000532.2 dated Aug. 10, 2011 (4 pages).

International Search Report and Written Opinion of International Search Authority for PCT/CN2009/072235 dated Sep. 10, 2009 (12 pages).

Notification of Reason for Refusal, for JP patent application 2011-512820, dated Jan. 31, 2012(3 pages).

Translation of the Notification for JP patent application 2011-512820(4 pages).

JPOA for JP patent application 2012-506330 dated Dec. 11, 2012(7 pages).

IEEE C802.16m-08/995r1, Multi-Carrier Supported Handover Procedures, Inuk Jung et al. Sep. 5, 2008 (7 pages).

IEEE C802.16m-09/0433r2, CR on SDD: Clarification on Multi-Carrier Handover, Kelvin Chou et al. dated Feb. 27, 2009 (3 pages).

IEEE C802.16m-08/1160r1, Procedures for Multicarrier Support, Youngsoo Yuk et al. Sep. 9, 2008 (6 pages).

Office Action for related U.S. Appl. No. 12/799,361 dated Oct. 11, 2012 (23 pages).

Taiwan IPO, the Examination Opinion of Taiwan patent application 099112819 dated Jun. 19, 2013 (3 pages).

SIPO, the First Examination Opinion of Chinese patent application 201080001186.2, dated Jul. 3, 2012. (8 pages).

SIPO, the First Search Report of Chinese patent application 201080001186.2(2 pages).

USPTO OA, for related U.S. Appl. No. 12/799,361, dated May 22, 2012(21 Pages).

Chou, K et al., "Mobility Management with Multi-Carrier Support for IEEE802.16m", IEEE C802.16m-08/564r2, Jul. 14, 2008(17 pages).

Jang, J et al., "Handover Scheme for IEEE802.16m", IEEE C802.16m-08/774, Jul. 7, 2008(10 pages).

Chou, K et al., "Mobility Management with Multi-Carrier Support in IEEE 802.16m", IEEE C802.16m-08/144r1, Mar. 10, 2008(8 pages).

Taiwan IPO, the Examination Opinion of Taiwan patent application 098119346 dated Mar. 28, 2013 (4 pages).

* cited by examiner

SCANNING AND HANDOVER OPERATION
IN MULTI-CARRIER WIRELESS SYSTEMS

MULTI-CARRIER SCANNING OPERATION FLOW

MULTI-CARRIER HANDOVER BBE OPERATION FLOW

N-TO-N CARRIERS BBE HANDOVER

MULTI-CARRIER HANDOVER EBB OPERATION FLOW

2-TO-2 CARRIERS INTRA-FA EBB HANDOVER

2-TO-2 CARRIERS INTER-FA EBB HANDOVER

N-TO-N CARRIERS INTRA-FA EBB HANDOVER

N-TO-N CARRIERS INTER-FA EBB HANDOVER

SCANNING AND HANDOVER OPERATION IN MULTI-CARRIER WIRELESS COMMUNICATIONS SYSTEMS

CROSS REFERENCE TO RELATED APPLICATIONS

This application claims priority under 35 U.S.C. §119 from U.S. Provisional Application No. 61/060,563, entitled "Scanning and Hard Handover Design for Multicarrier OFDMA Systems," filed on Jun. 11, 2008; U.S. Provisional Application No. 61/078,559, entitled "Soft Handover Design for Multi-Band OFDMA Systems," filed on Jul. 7, 2008, the subject matter of which is incorporated herein by reference.

TECHNICAL FIELD

The disclosed embodiments relate generally to wireless network communications, and, more particularly, to scanning and handover in multi-carrier wireless systems.

BACKGROUND

In current wireless communications systems, 5 MHz~20 MHz radio bandwidths are typically used for up to 100 Mbps peak transmission rate. Much higher peak transmission rate is required for next generation wireless systems. For example, 1 gbps peak transmission rate is required by ITU-R for IMT-Advanced systems such as the $4^{th}$ generation ("4G") mobile communications systems. The current transmission technologies, however, are very difficult to perform 100 bps/Hz transmission spectrum efficiency. In the foreseeable next few years, only up to 15 bps/Hz transmission spectrum efficiency can be anticipated. Therefore, much wider radio bandwidths (i.e., at least 40 MHz) will be necessary for next generation wireless communications systems to achieve 1 Gbps peak transmission rate.

Orthogonal Frequency Division Multiplexing (OFDM) is an efficient multiplexing protocol to perform high transmission rate over frequency selective channel without the disturbance from inter-carrier interference. There are two typical architectures to utilize much wider radio bandwidth for OFDM system. In a traditional OFDM system, a single radio frequency (RF) carrier is used to carry one wideband radio signal, and in an OFDM multi-carrier system, multiple RF carriers are used to carry multiple narrower band radio signals. The multi-carrier operation is also known as carrier aggregation. An OFDM multi-carrier system has various advantages as compared to a traditional OFDM system such as lower Peak to Average Power Ratio, easier backward compatibility, and more flexibility. Thus, OFDM multi-carrier wireless systems have become the baseline system architecture in IEEE 802.16m and LTE-Advanced draft standards to fulfill system requirements.

Scanning and handover are critical operations in wireless communications systems. FIG. 1 (Prior Art) is a message sequence diagram of a normal scanning procedure in a single-carrier wireless system. Before the initiation of the scanning procedure, a mobile station (MS) may receive parameters for neighbor base stations (BS#2 and BS#3) from serving base station BS#1. The MS then sends a scanning request to BS#1 and receives a scanning response back from BS#1. The MS then scans the neighbor BSs within the scheduled scanning period. Optionally, the MS may also perform initial ranging with the neighbor BSs. During the scanning operation, data communication is interrupted because of interleaved scanning intervals. In an autonomous scanning procedure, the MS simply performs scanning whenever it does not communicate data with its serving BS.

FIG. 2 (Prior Art) is a message sequence diagram of a normal handover procedure in a single-carrier wireless system. In either a BS-initiated or an MS-initiated handover operation, existing data path is disconnected from the serving base station (S-BS) after the MS transmits a handover indication message, and data communication remains interrupted while the MS performs network reentry to the target base station (T-BS) until a new data path is established with the T-BS. In a seamless handover procedure, if the T-BS is fully synchronized with the S-BS in both time and frequency domain, then the MS may proceed to data transmission immediately without downlink synchronization and initial ranging.

In OFDM multi-carrier wireless systems, it is desirable to have a comprehensive solution to facilitate multi-carrier scanning and handover operations such that data interruption caused by scanning and handover can be reduced.

SUMMARY

A comprehensive solution is provided for multi-carrier scanning and handover operations in OFDM wireless systems. As a general design concept, one radio frequency carrier is established as a primary carrier for control message exchange and data communication between a mobile station and its serving base station, while another radio frequency carrier is established as a secondary carrier between the mobile station and the serving base station for data communication. The secondary carrier can also be used for scanning, initial ranging, and network reentry between the mobile station and a target base station.

A multi-carrier scanning is any scanning operation that involves multi-carrier radio frequency carriers. In one embodiment, a mobile station communicates with its serving base station over a primary radio frequency carrier, and performs scanning over one or more determined radio frequency carriers. The determined carriers may include the primary carrier, a secondary carrier, or multiple carriers that include both the primary carrier and one or more secondary carriers. When scanning operation is performed using multiple carriers simultaneously, the overall scanning time can be reduced.

A multi-carrier handover is any handover operation that involves multiple radio frequency carriers. In a first embodiment, a break-before-entry (BBE) handover procedure for a mobile station with fast synchronization is provided. The MS receives a handover command from its serving BS via a primary carrier, the MS then performs DL and optional UL synchronization with a target BS using a secondary carrier. After the synchronization is completed, the MS disconnects all carriers from the serving BS and then performs network reentry with the target BS via either the primary carrier or the secondary carrier to establish new data path with the target BS. Because full or part of the UL/DL parameters acquired during synchronization using the secondary carrier can be used for network reentry, handover interruption time is reduced. The multi-carrier BBE handover procedure may be applied to 2-to-2 or N-to-N carriers handover situation.

In a second embodiment, an entry-before-break (EBB) handover procedure for a mobile station through unavailable intervals is provided. During handover operation, the MS requests unavailable intervals and then performs network reentry with a target BS. Because network reentry is performed within the requested unavailable intervals, any existing connection between the MS and its serving BS remains until a new primary carrier is established between the MS and the target BS.

In a third embodiment, EBB handover procedures for a mobile station for both inter-FA handover and intra-FA handover using multiple radio frequency carriers are provided. The MS receives a handover command from its serving BS via a primary carrier. The MS then performs network reentry with a target BS using either the primary carrier or a secondary carrier. After network reentry is completed, the MS establishes a new primary carrier with the target BS. Finally, the MS disconnects the original primary carrier from the serving BS. The multi-carrier EBB handover procedure may be applied to 2-to-2 or N-to-N carriers handover situation.

In a fourth embodiment, intra-BS handover procedures for a mobile station are provided. The MS requests or is requested by its serving BS to reallocate its primary carrier to another carrier of the same serving BS through intra-BS handover request (optional) and command message exchange. After intra-BS handover, the primary carrier is switched from one carrier frequency to another carrier frequency within the same serving BS.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
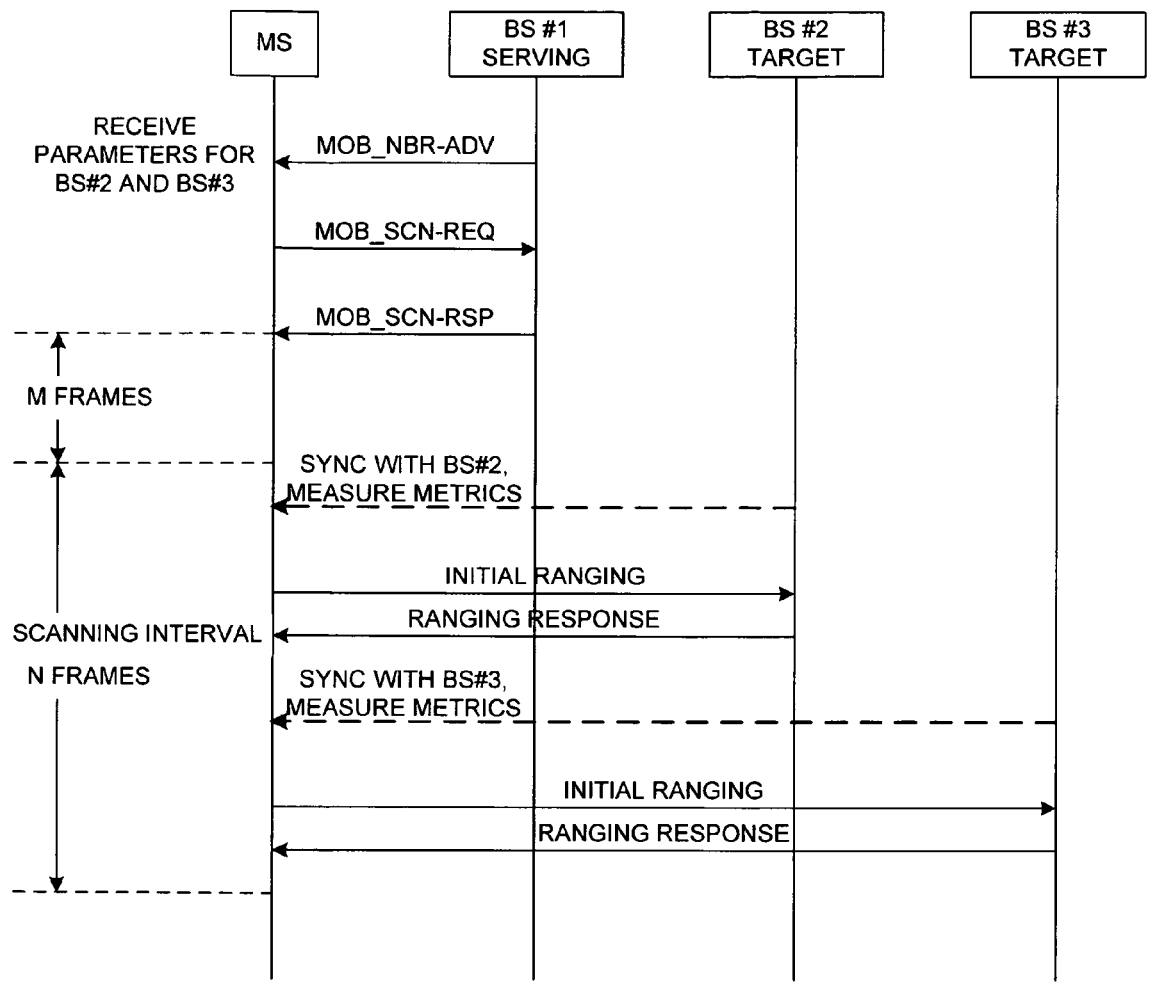
FIG. 1 (Prior Art) is a message sequence diagram of a normal scanning procedure in a single-carrier wireless system.
Figure 2:
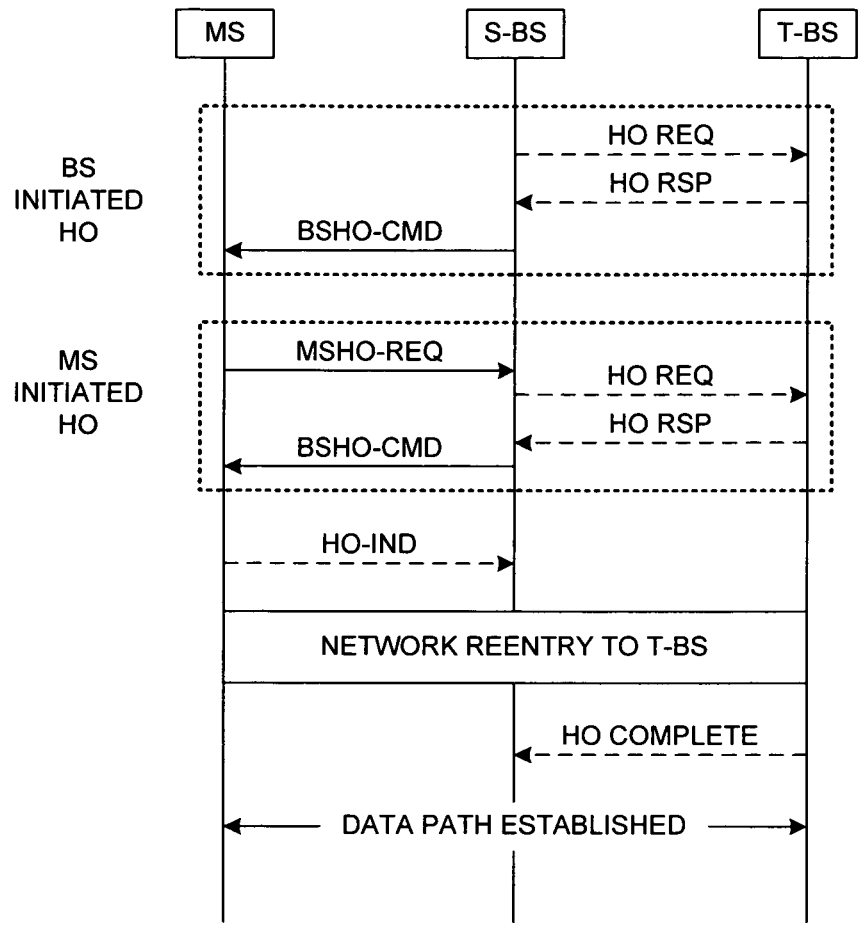
FIG. 2 (Prior Art) is a message sequence diagram of a normal handover procedure in a single-carrier wireless system.
Figure 3:
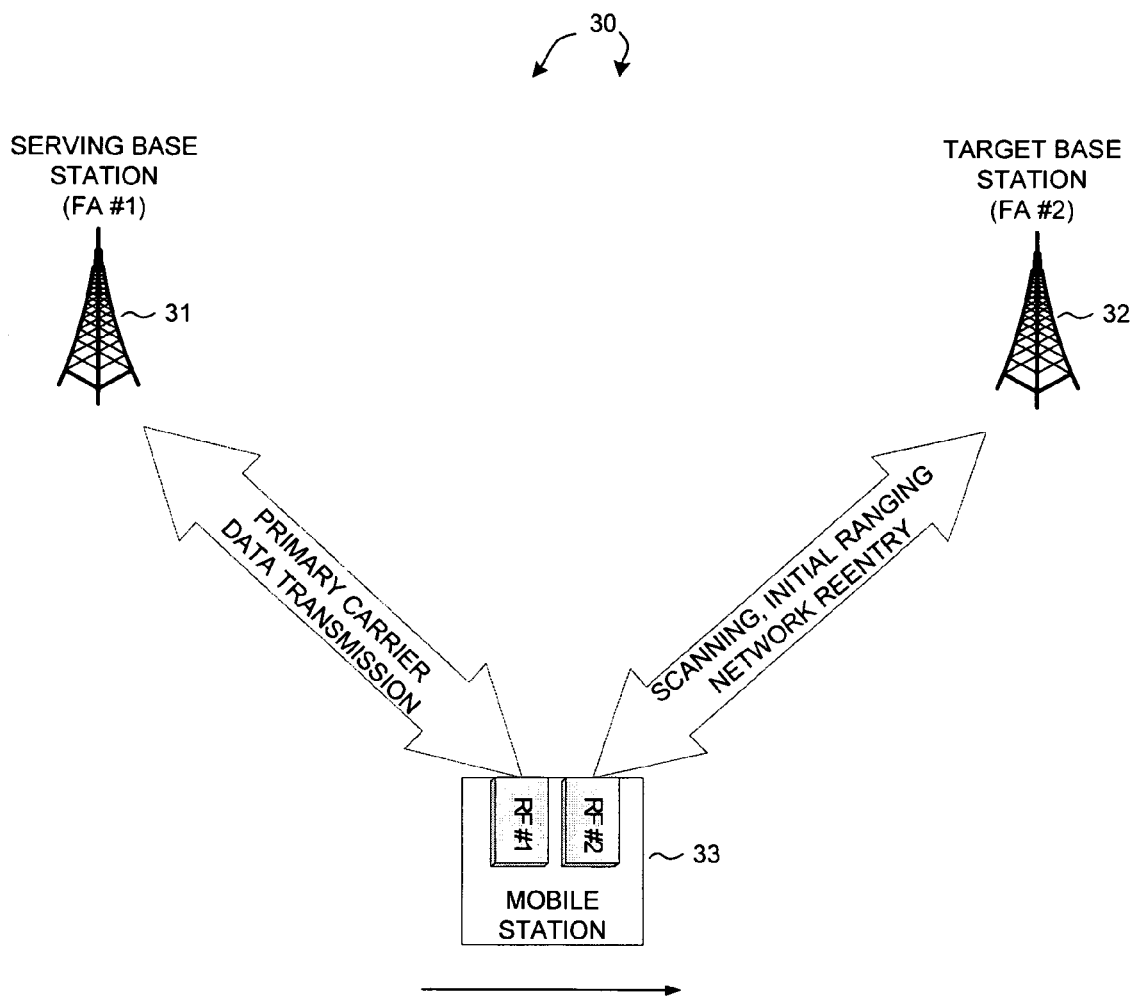
FIG. 3 illustrates a high-level design of scanning and handover operation in a multi-carrier wireless system in accordance with one novel aspect.

FIG. 3 illustrates a high-level design of scanning and handover operation in a multi-carrier wireless communications system 30 in accordance with one novel aspect. Multi-carrier wireless system 30 comprises a serving base station S-BS31, a target base station T-BS32, and a mobile station MS33. Mobile station MS33 supports two radio frequency carriers (also referred as carrier components): RF#1 and RF#2. In the example of FIG. 3, as a general design concept, RF#1 is established as a primary carrier (also referred as anchor carrier) for control message exchange and data communication with serving base station S-BS31, while RF#2 is used as a secondary carrier (also referred as non-anchor carrier) for data communication with serving base station S-BS31 and can also be used for scanning, initial ranging, and network reentry with target base station T-BS32.

Figure 4:
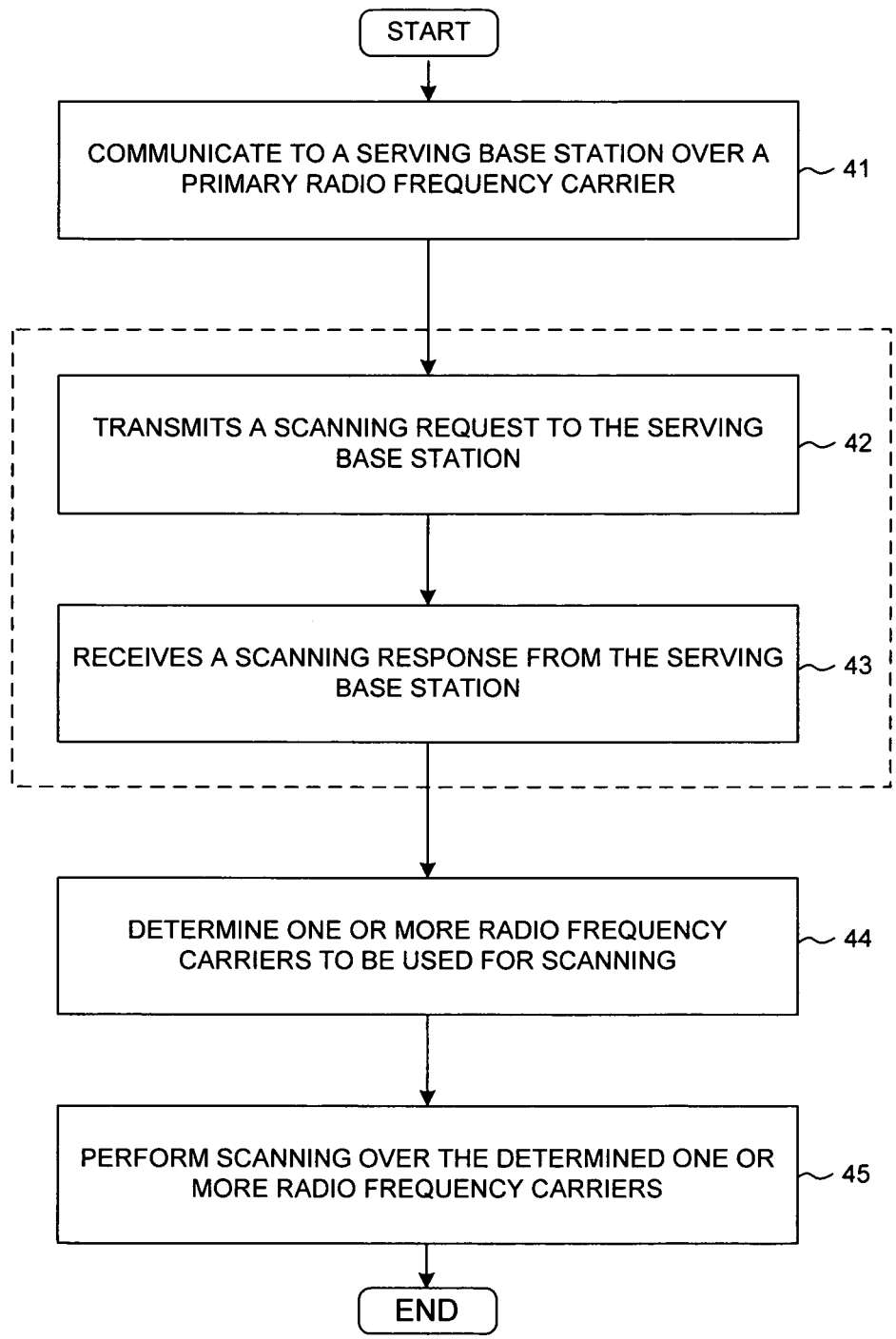
FIG. 4 is a flow chart of a method of multi-carrier scanning operation in accordance with one novel aspect.

FIG. 4 is a flow chart of a method of multi-carrier scanning operation in accordance with one novel aspect. A multi-carrier scanning operation is any scanning operation that involves multiple radio frequency carriers. In a multi-carrier wireless system, a multi-carrier MS supports multiple radio frequency (RF) carriers, and uses one of the RF carriers as a primary carrier to communicate data with its serving BS (step 41). To initiating a normal scanning procedure, the mobile station transmits a scanning request to the serving BS (step 42), and then receives a scanning response from the serving BS (step 43). In an autonomous scanning procedure, step 42 and 43 are not required. In step 44, the mobile station determines which radio frequency carrier is used for scanning. The determined carrier can be a primary carrier, a secondary carrier, or both. Finally, in step 45, the mobile station performs scanning over the determined one or more radio frequency carriers.

Figure 5:
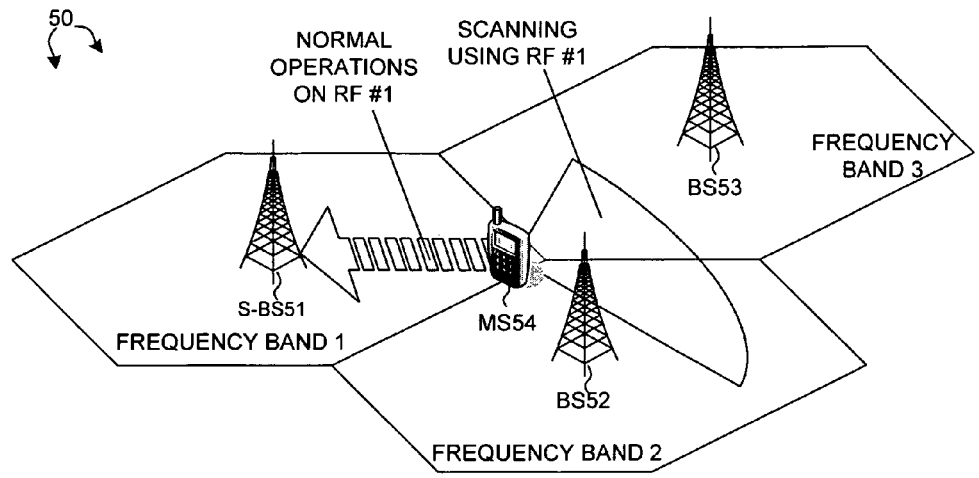
FIG. 5 illustrates a scanning procedure using primary carrier in a multi-carrier wireless system.

FIG. 5 illustrates a scanning procedure using primary carrier in a multi-carrier wireless system 50. Multi-carrier wireless system 50 comprises a serving base station S-BS51, neighbor base stations BS52 and BS53, and a mobile station MS54. MS54 supports RF#1 as its primary carrier and RF#2 as its secondary carrier. As illustrated in FIG. 5, MS54 scans neighbor BSs while maintaining normal operation with S-BS51 on primary carrier RF#1. Because scanning is performed during interleaved scanning intervals, normal data communications is interrupted periodically by the scanning operation.

Figure 6:
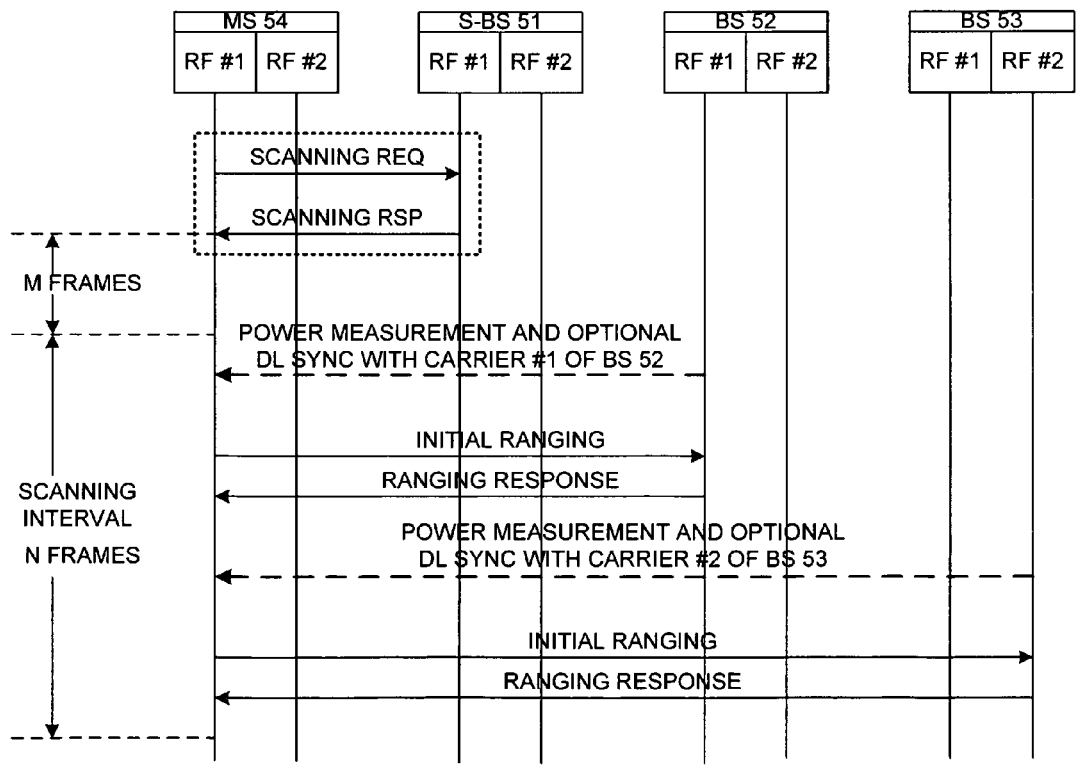
FIG. 6 is a message sequence chart of a scanning procedure using primary carrier in a multi-carrier wireless system.

FIG. 6 is a more detailed message sequence chart corresponds to the scanning procedure using primary carrier in multi-carrier wireless system 50. In the example of FIG. 6, mobile station MS54 initiates a normal scanning operation by transmitting a scanning request to serving base station S-BS51 for scheduled scanning intervals. S-BS51 responds by transmitting a scanning response back to MS54 with scheduled start frame (M frame) and duration frame (N frame) for scanning. During the scanning interval, MS54 starts to measure carrier #1 (RF#1) of neighbor base station BS52, and then optionally performs downlink (DL) synchronization procedure with RF#1 of BS52 using the primary carrier RF#1 of MS54. The measurement objective can be radio signal strength (RSS), carrier-to-interference noise ratio (CINR) and round trip delay (RTD). In addition, MS54 may optionally perform initial ranging procedure with RF#1 of BS52 during the scanning interval if possible and needed. Such scanning operation is then repeated with carrier #2 (RF#2) of another neighbor base station BS53. Additional scanning may be performed during additional scanning intervals interleaved with normal operations.

Similar to a single-carrier scanning operation, the above-described multi-carrier scanning operation is performed on the primary carrier RF#1 only and data communications is thus interrupted on RF#1. Multi-carrier mobile station MS54, however, is able to maintain data communication with its serving base station S-BS51 through its secondary carrier RF#2. Another difference between multi-carrier scanning and single-carrier scanning is the capability of scanning multiple carriers within a neighbor base station. In one example (i.e. IEEE 802.16m system), if a neighbor base station supports multiple RF carriers, then MS54 scans fully configured carriers of the neighbor BSs during cell reselection. MS54 may not need to scan partially configured carriers because they may not be used to perform network reentry.

Figure 7:
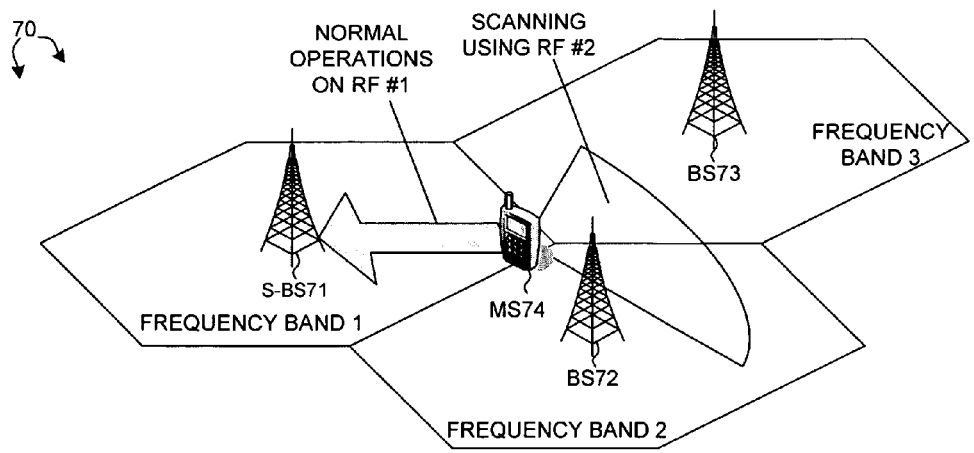
FIG. 7 illustrates a scanning procedure using secondary carrier in a multi-carrier wireless system.

FIG. 7 illustrates a scanning procedure using secondary carrier in a multi-carrier wireless system 70. Multi-carrier wireless system 70 comprises a serving base station S-BS71, neighbor base stations BS72 and BS73, and a mobile station MS74. MS74 supports RF#1 as its primary carrier and RF#2 as its secondary carrier. As illustrated in FIG. 7, MS74 scans neighbor BSs using the secondary carrier RF#2 while maintaining normal operation with S-BS51 on primary carrier RF#1. Because scanning is performed using a carrier different from the primary carrier, normal data communications is not interrupted by the scanning operation.

Figure 8:
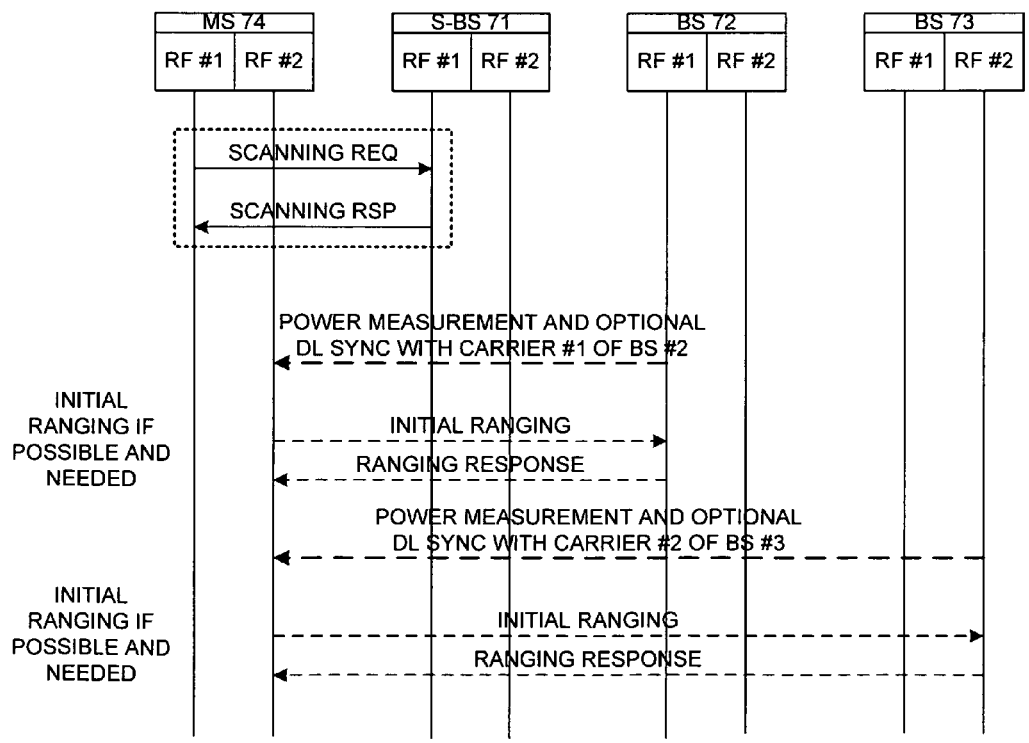
FIG. 8 is a message sequence chart of a scanning procedure using secondary carrier in a multi-carrier wireless system.

FIG. 8 is a more detailed message sequence chart corresponds to the scanning procedure using secondary carrier in multi-carrier wireless system 70. MS74 communicates with S-BS71 over primary carrier RF#1. MS74 may also communicate with S-BS71 over secondary carrier RF#2. As illustrated in FIG. 8, MS74 first exchanges scanning request and response messages with S-BS71 for scheduled scanning intervals. The scanning request and response messages may be exchanged over either the primary carrier or the secondary carrier. During the scanning interval, MS74 starts to measure carrier #1 (RF#1) of neighbor base station BS72, and then optionally performs DL synchronization with RF#1 of BS72 using the secondary carrier RF#2 of MS74. In addition, MS74 may optionally perform initial ranging procedure with RF#1 of BS72 during the scanning interval if possible and needed. Such scanning operation is then repeated with carrier #2 (RF#2) of another neighbor base station BS73. Because the multi-carrier scanning operation is performed using the secondary carrier, it goes in parallel with normal operation on the primary carrier without interruption to the normal data communications with the serving BS.

Figure 9:
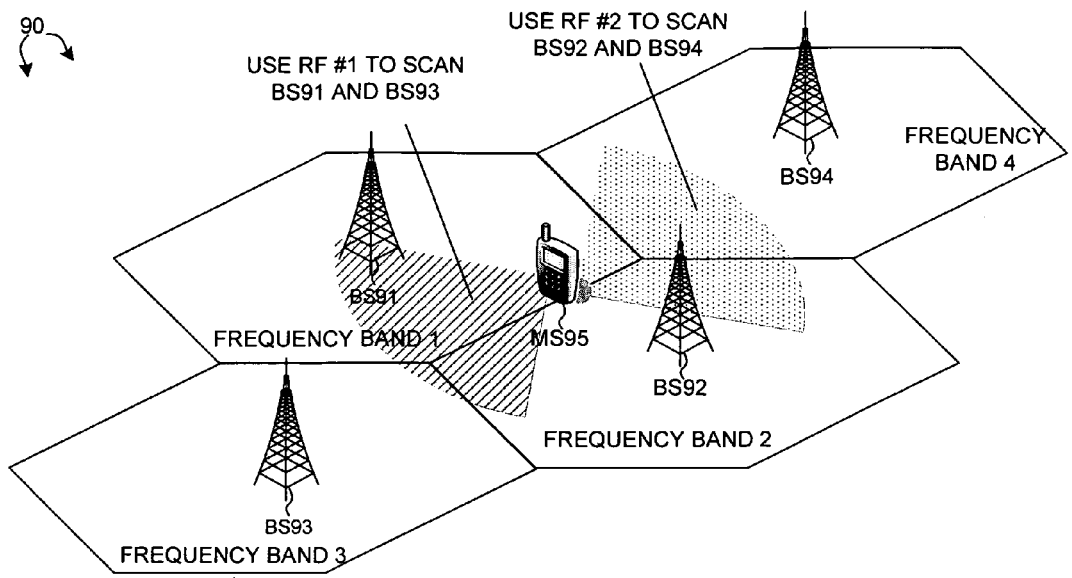
FIG. 9 illustrates a scanning procedure using multiple carriers in a multi-carrier wireless system.

FIG. 9 illustrates a scanning procedure using multiple carriers including primary carrier and secondary carriers in a multi-carrier wireless system 90. Multi-carrier wireless system 90 comprises neighbor base stations BS91, BS92, BS93 and BS94, and a mobile station MS95. MS95 supports RF#1 as its primary carrier and RF#2 as its secondary carrier. As illustrated in FIG. 9, MS95 scans neighbor base stations BS91 and BS93 using the primary carrier RF#1 while scans neighbor base stations BS92 and BS94 using the secondary carrier RF#2.

Figure 10:
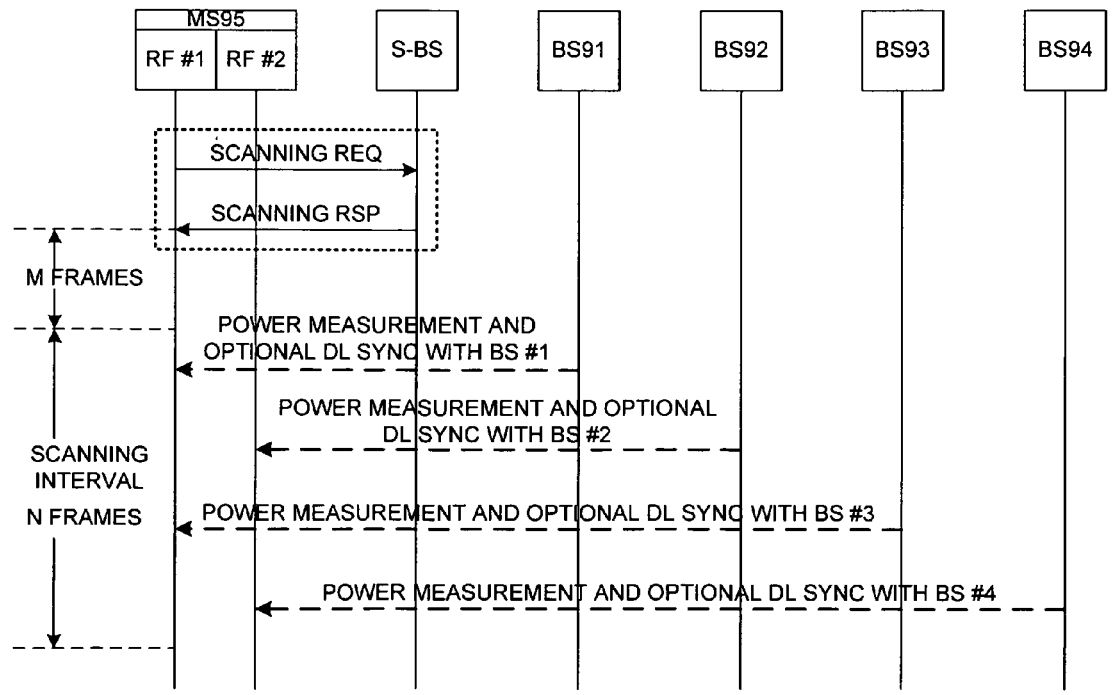
FIG. 10 is a message sequence chart of a scanning procedure using multiple carriers in a multi-carrier wireless system.

FIG. 10 is a more detailed message sequence chart corresponds to the scanning procedure using both primary carrier and secondary carrier in multi-carrier wireless system 90. As illustrated in FIG. 10, during the scheduled scanning interval, MS95 starts to perform measurement and DL synchronization with BS91 using the primary carrier RF#1. In addition, MS95 also starts to perform measurement and DL synchronization with BS92 using the secondary carrier RF#2. After the scanning and the synchronization with BS91 and BS92 are completed, MS95 starts to scan BS93 and BS94 using the primary carrier RF#1 and the secondary carrier RF#2, respectively. Because such scanning operation is performed using multiple carriers simultaneously, the overall scanning time is reduced and faster cell reselection may be achieved.

In one embodiment of multi-carrier scanning, a mobile station may not be connected to its serving base station when performing the scanning operation. In such a situation, the mobile station simply uses multiple carriers simultaneously to reduce scanning time.

Similar to multi-carrier scanning operation, a multi-carrier handover operation is any handover operation that involves multiple radio frequency carriers. There are various types of multi-carrier handover operations: break-before-entry (BBE) handover with fast synchronization, entry-before-break (EBB) handover through unavailable intervals, EBB handover through multiple carriers, and intra-BS primary carrier switching. Each of the handover operations is described below with more detail.

Figure 11:
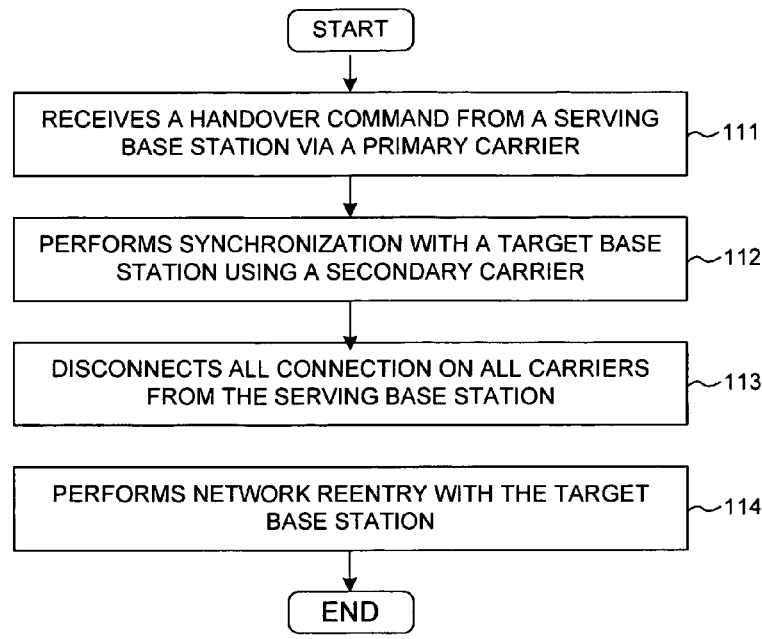
FIG. 11 is a flow chart of a method of multi-carrier break-before-entry (BBE) handover operation in accordance with one novel aspect.

FIG. 11 is a flow chart of a method of multi-carrier BBE handover operation with fast synchronization in accordance with one novel aspect. In step 111, a multi-carrier mobile station (MS) receives a handover command from a serving BS via a primary carrier. The MS then performs downlink (DL) and optional uplink (UL) synchronization with a target BS using a secondary carrier in step 112. After synchronization is completed, the MS sends an optional handover indication to the serving BS and disconnects all carriers from the serving BS (step 113). Finally, the MS performs network reentry with the target BS via either the primary carrier or the secondary carrier to establish new data path with the target BS.

Figure 12:
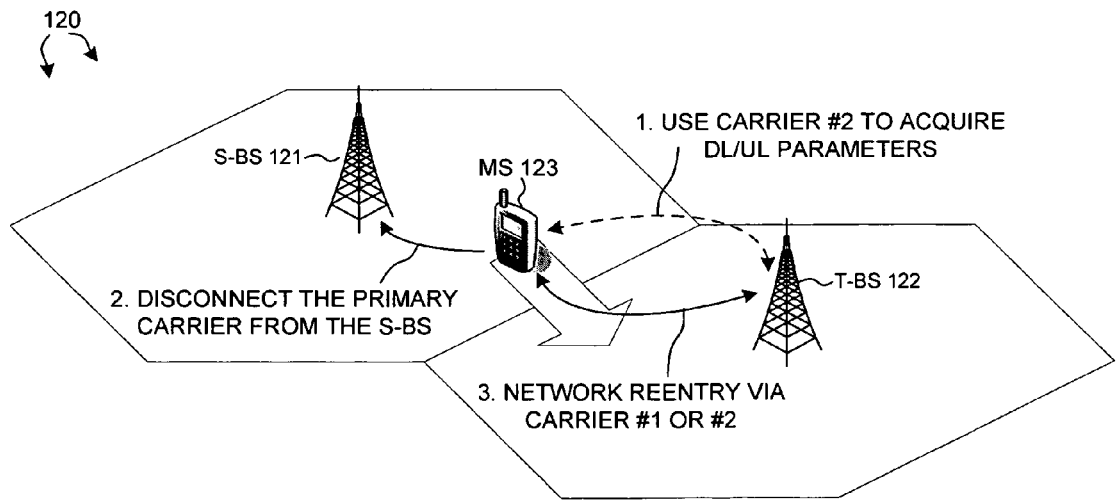
FIG. 12 illustrates a BBE handover procedure with fast synchronization using secondary carrier.

FIG. 12 illustrates a BBE handover procedure with fast synchronization using secondary carrier in a multi-carrier wireless system 120. Multi-carrier wireless system 120 comprises a serving base station S-BS121, a target base station T-BS122, and a mobile station MS123. MS123 supports carrier #1 as its primary carrier and carrier #2 as its secondary carrier. As illustrated in FIG. 12, during handover operation, MS123 uses the secondary carrier to perform DL synchronization and acquire DL/UL parameters with T-BS122 and then disconnects all carriers from S-BS121 before network reentry is performed. Because full or part of the UL/DL parameters of T-BS122 can be acquired through the synchronization process to T-BS122 using the secondary carrier of MS123, MS123 can use these acquired information for its network reentry to T-BS122 afterward. Therefore, handover interruption time is reduced.

Figure 13A:
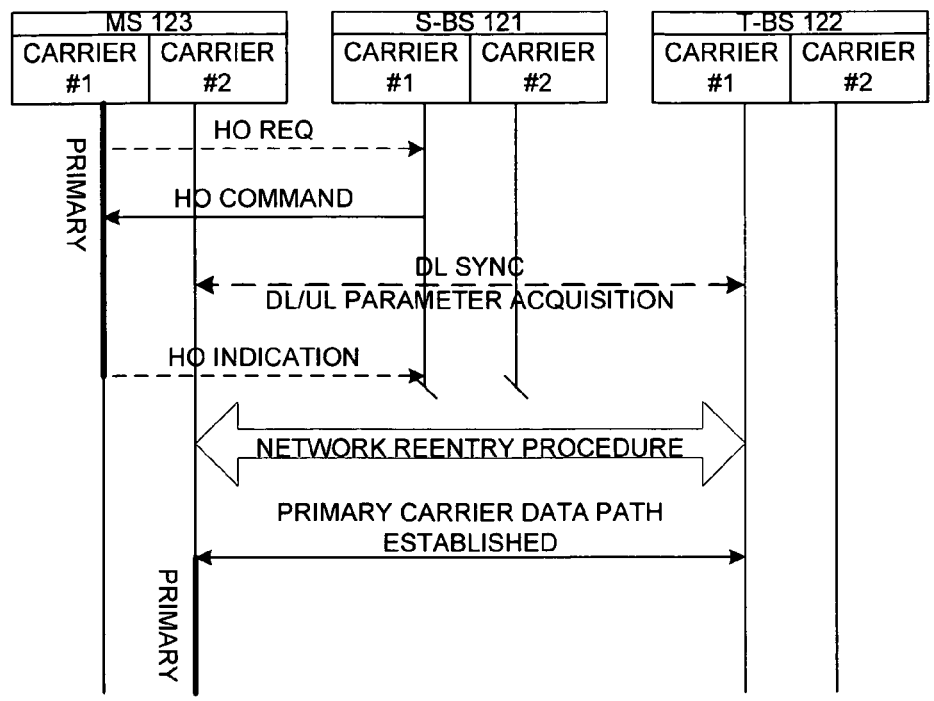
FIG. 13A is a message sequence chart of one embodiment of a multi-carrier BBE handover procedure with fast synchronization using secondary carrier.

FIG. 13A is a more detailed message sequence chart of one embodiment of a BBE handover procedure in multi-carrier wireless system 120. The multi-carrier handover operation is either initiated by MS123 through a handover request message to its serving base station S-BS121, or initiated by the serving based station S-BS121 through a handover command to MS123. After receiving the handover command, MS123 starts to perform synchronization procedure with target base station T-BS122 using its secondary carrier. The synchronization procedure may include performing downlink physical layer synchronization, obtaining network reentry related system parameters, and performing ranging for uplink power/timing/frequency adjustments. After the synchronization procedure is completed, MS123 may send a handover indication to S-BS121. MS123 then disconnects all carriers from S-BS121 and starts to perform network reentry procedure with T-BS122 using the secondary carrier. After the network reentry, the secondary carrier (carrier #2) becomes the new primary carrier and a new data path is established between MS123 and T-BS122.

Figure 13B:
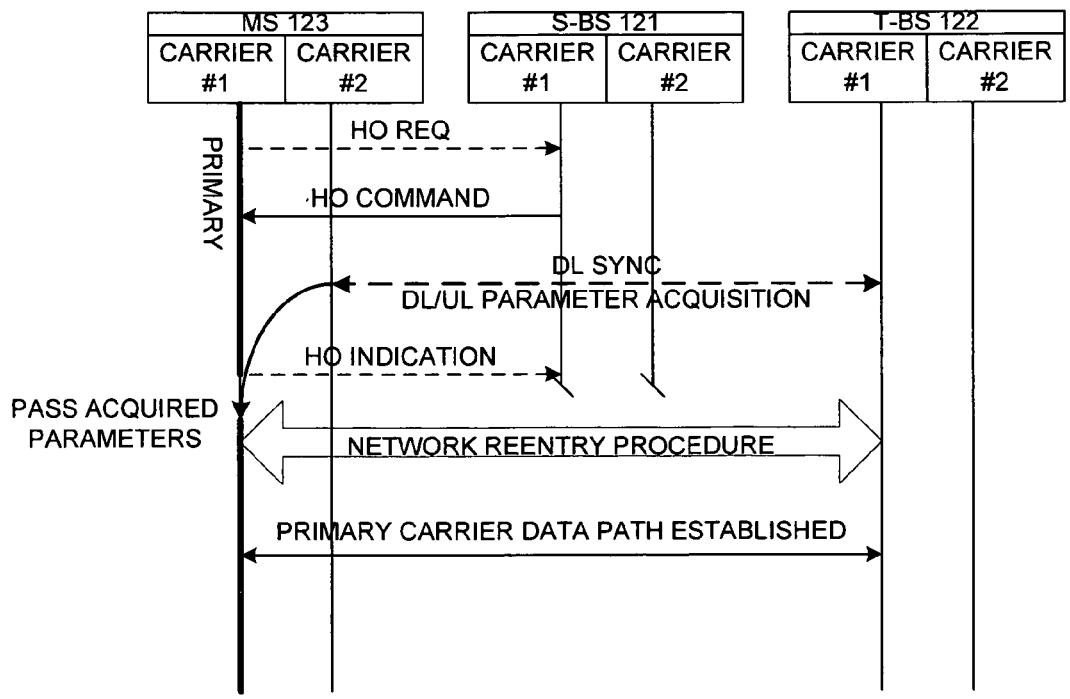
FIG. 13B is a message sequence chart of another embodiment of a multi-carrier BBE handover procedure with fast synchronization using secondary carrier.

FIG. 13B is a more detailed message sequence chart of another embodiment of a BBE handover procedure in multi-carrier wireless system 120. The handover procedure is similar to the one illustrated above with respect to FIG. 13A. However, the acquired DL/UL physical layer parameters are passed from the secondary carrier to the primary carrier and network reentry is performed using the primary carrier. Thus, the original primary carrier remains as the new primary carrier for the new data path.

Figure 14:
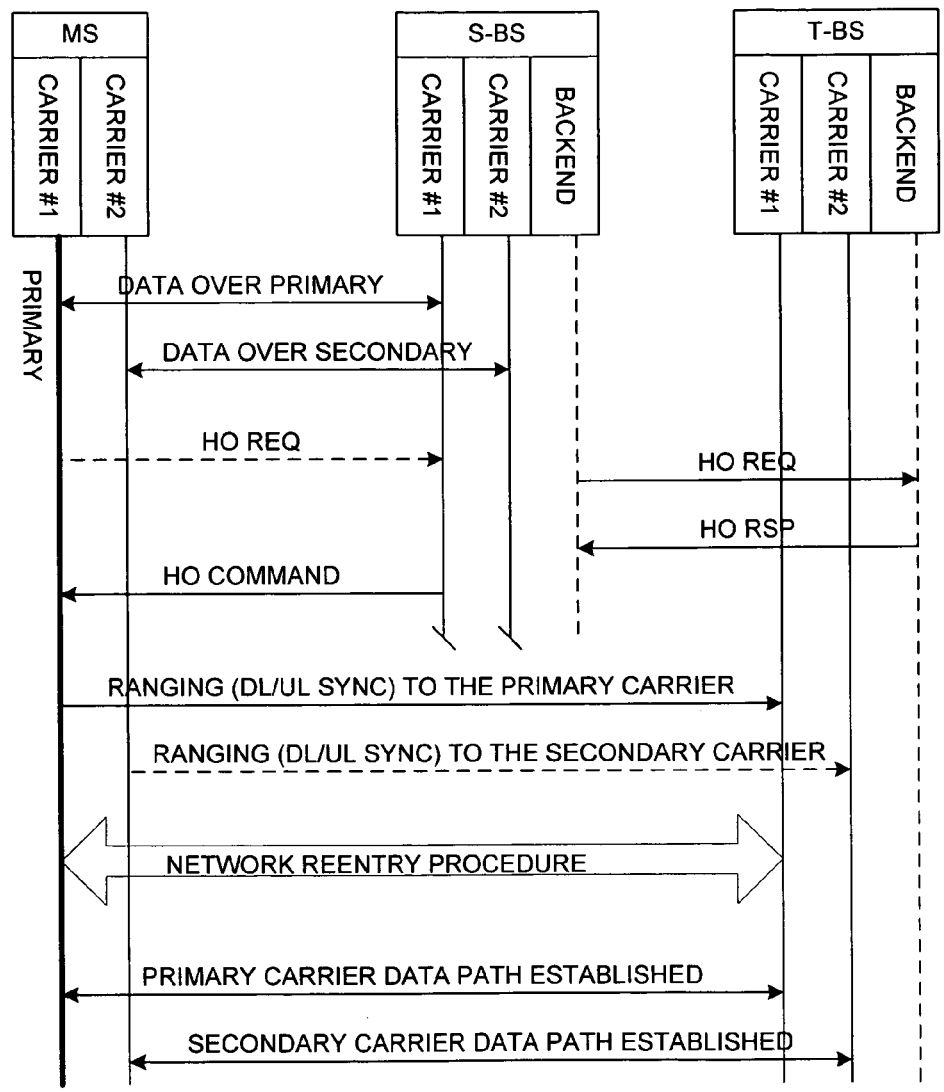
FIG. 14 is a message sequence chart of 2-to-2 carriers BBE handover procedure.

FIG. 14 is a message sequence chart of a 2-to-2 carriers BBE handover procedure. In a 2-to-2 carriers handover situation, a mobile station (MS) communicates with its serving base station (S-BS) over both a primary carrier (carrier #1) and a secondary carrier (carrier #2), and both serving carriers will be handed over to two target carriers of a target base station (T-BS) after the completion of the 2-to-2 carriers handover operation. For MS-initiated handover, the MS and the S-BS exchanges handover request and command messages via the primary carrier. For BS-initiated handover, the MS receives handover command from the S-BS. Because multi-carrier handover is involved, the S-BS informs the T-BS for handover of multiple carriers via backend, and receives a handover response back from the T-BS. The S-BS then forwards the information of target carrier assignment and configuration to the MS. The MS then performs handover ranging (i.e. UL synchronization) on the target primary carrier after disconnecting all connections from the S-BS. Handover ranging on the target secondary carrier may either be performed or be skipped depending on the synchronization status. The MS then performs network reentry on the target primary carrier. New connections are thus established on both the target primary carrier and the target secondary carrier simultaneously.

Figure 15:
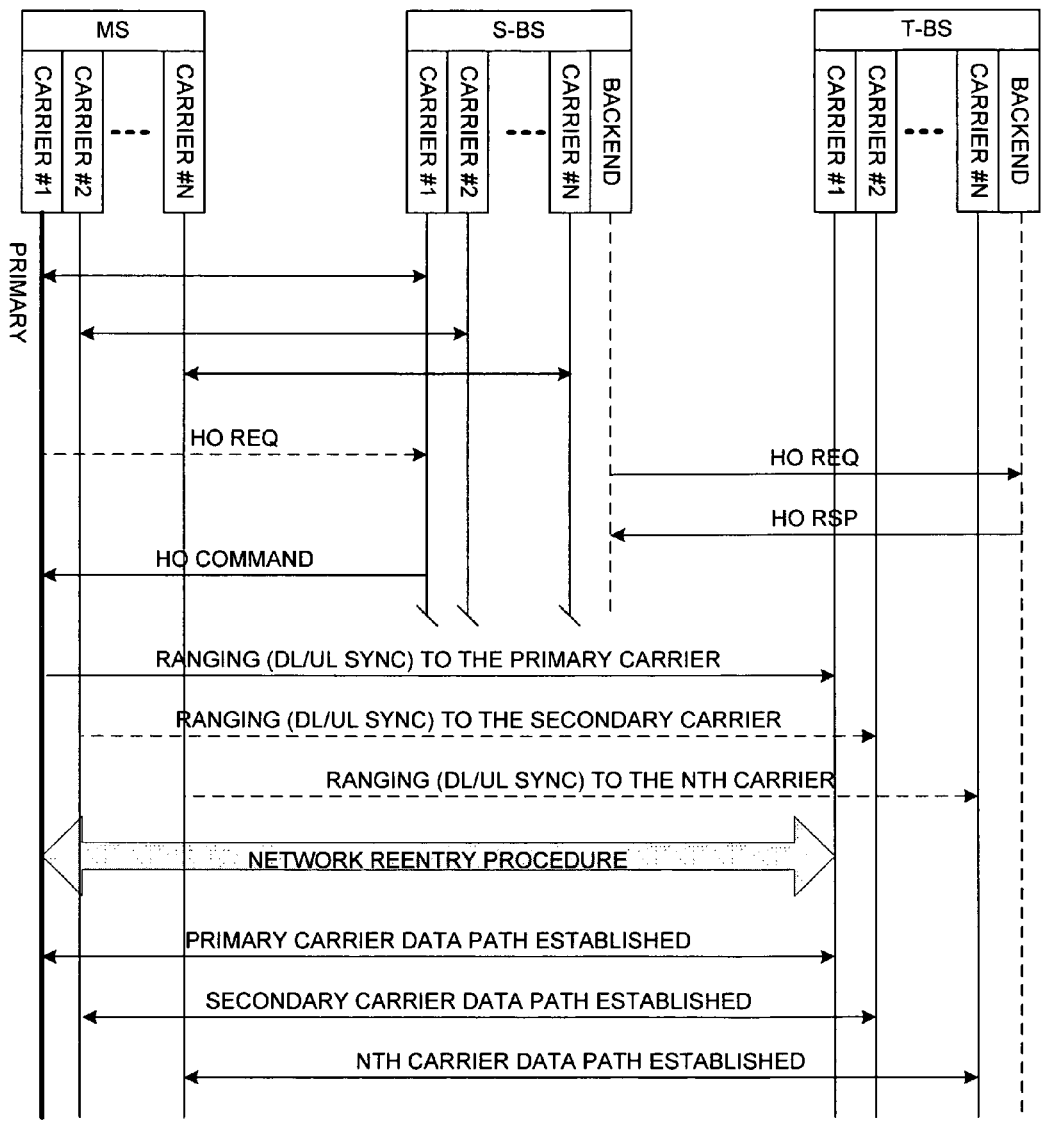
FIG. 15 is a message sequence chart of N-to-N carriers BBE handover procedure.

FIG. 15 is a message sequence chart of an N-to-N carriers BBE handover procedure. In an N-to-N carrier handover situation, a mobile station (MS) communicates with its serving base station (S-BS) over N multiple carriers (carrier #1-#N), and all N serving carriers will be handed over to N target carriers of a target base station (T-BS) after the completion of the N-to-N carriers handover operation. The N-to-N carriers BBE handover procedure is similar to the 2-to-2 carriers BBE handover described above with respect to FIG. 14. It is noted that although ranging to the target primary carrier has to be performed after disconnecting all existing connections with the S-BS, additional ranging to other target secondary carriers may be skipped. Furthermore, all new connections on the target primary carrier and other target secondary carriers are established simultaneously after the network reentry on the target primary carrier.

Figure 16:
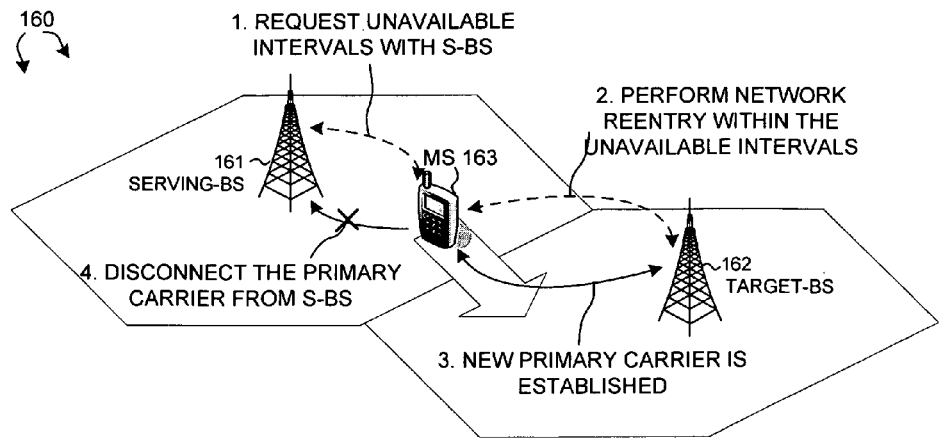
FIG. 16 illustrates an entry-before-break (EBB) handover procedure through unavailable intervals.

FIG. 16 illustrates an EBB handover procedure through unavailable intervals in a multi-carrier wireless system 160. Multi-carrier wireless system 160 comprises a serving base station S-BS161, a target base station T-BS162, and a mobile station MS163. MS163 supports carrier #1 as its primary carrier and carrier #2 as its secondary carrier. As illustrated in FIG. 16, during handover operation, MS163 requests unavailable intervals with S-BS161 and then performs network reentry. Because network reentry is performed within the requested unavailable intervals, the existing connection between MS163 and S-BS161 remains until a new primary carrier is established with T-BS162.

Figure 17A:
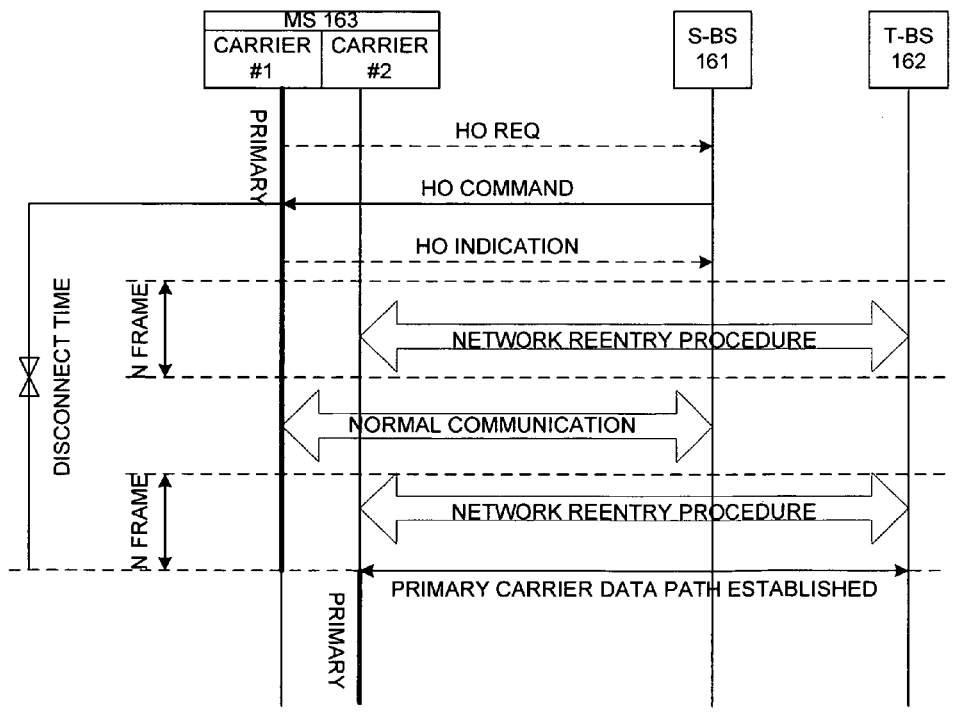
FIG. 17A is a message sequence chart of one embodiment of EBB handover procedure through unavailable intervals.

FIG. 17A is a more detailed message sequence chart of one embodiment of EBB handover procedure through unavailable intervals in multi-carrier wireless system 160. During the handover preparation phase, the length of each unavailable interval is negotiated between MS163 and S-BS161. In the example of FIG. 17A, MS163 performs network reentry procedure with T-BS162 on the secondary carrier within the scheduled intervals (N frame) while normal communication with S-BS161 is maintained on the primary carrier. After the new primary carrier with T-BS162 is established over the secondary carrier, MS163 immediately disconnects its primary carry to S-BS161. S-BS161 also stops all DL/UL data transmission and resource allocation upon expiration of Disconnect Time or receiving handover complete message from T-BS162, whichever comes first. In another example (not illustrated in FIG. 17A), the network reentry is performed on the primary carrier within the scheduled intervals, and the primary carrier remains as the new primary carrier after the network reentry is completed.

Figure 17B:
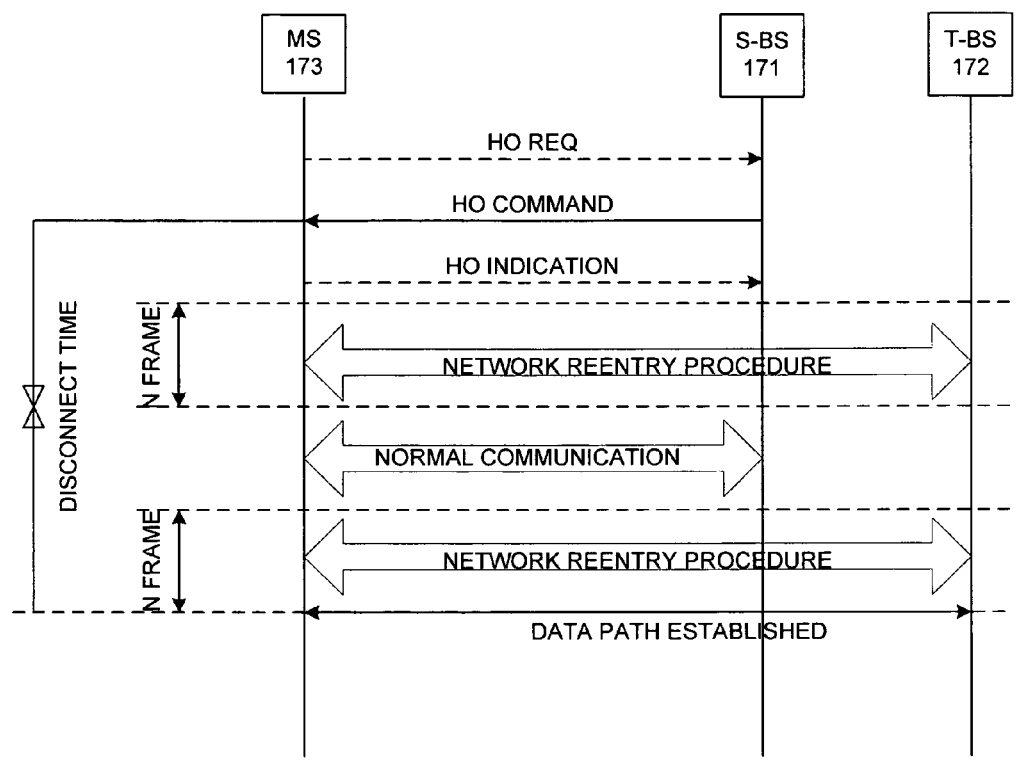
FIG. 17B is a message sequence chart of another embodiment of EBB handover procedure through unavailable intervals.

FIG. 17B is a sequence chart of another embodiment of EBB handover procedure through unavailable intervals. In the example of FIG. 17B, MS173 is a single-carrier mobile station and supports only one radio frequency carrier. Thus, it uses the same carrier to perform network reentry with S-BS172 within the scheduled intervals while maintains normal communication with S-BS171.

Figure 18:
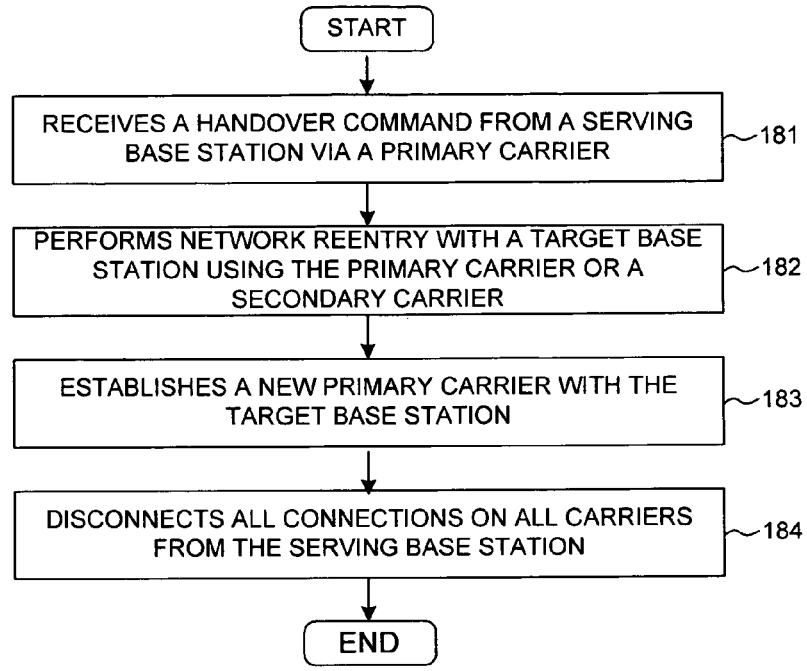
FIG. 18 is a flow chart of a method of multi-carrier EBB handover operation in accordance with one novel aspect.

FIG. 18 is a flow chart of a method of multi-carrier EBB handover operation in accordance with one novel aspect. In an EBB handover procedure using multiple radio frequency carriers, a multi-carrier mobile station first receives a handover command from a serving BS via a primary carrier (step 181). The mobile station then performs network reentry with a target BS using either the primary carrier or a secondary carrier (step 182). After network reentry is completed, the mobile station establishes a new primary carrier with the target BS (step 183). Finally, the mobile station disconnects the original primary carrier from the serving BS (step 184).

Figure 19:
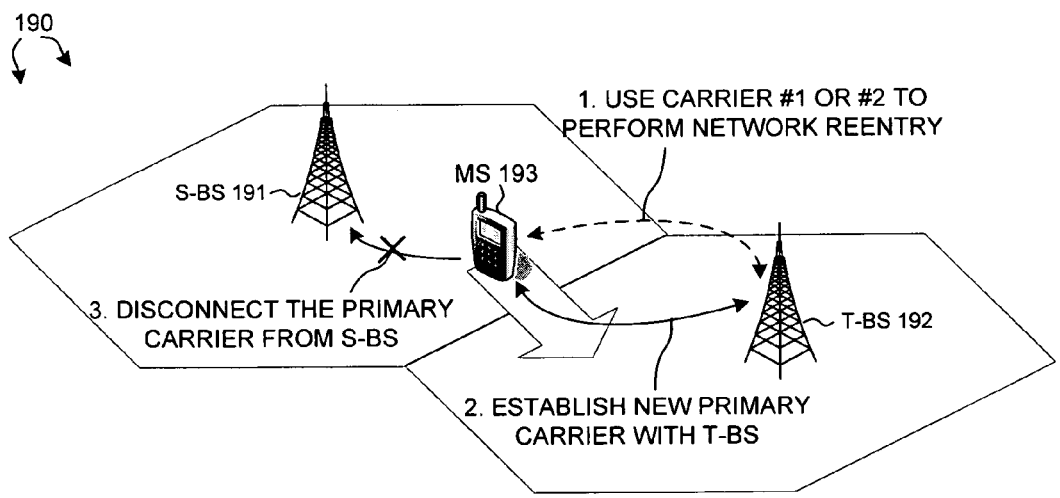
FIG. 19 illustrates an EBB handover procedure using multiple radio frequency carriers.

FIG. 19 illustrates an EBB handover procedure using multiple radio frequency carriers in a multi-carrier wireless system 190. Multi-carrier wireless system 190 comprises a serving base station S-BS191, a target base station T-BS192, and a mobile station MS193. MS193 supports carrier #1 as its primary carrier and carrier #2 as its secondary carrier. As illustrated in FIG. 19, during handover operation, MS193 first uses either carrier #1 or carrier #2 to perform network reentry and then establishes a new primary carrier with T-BS192. MS193 then disconnects the primary carrier from S-BS191 after network reentry is completed. There are two different types of multi-carrier EBB handover: an inter-FA handover and an intra-FA EBB handover, each handover operation is described below with more details.

Figure 20A:
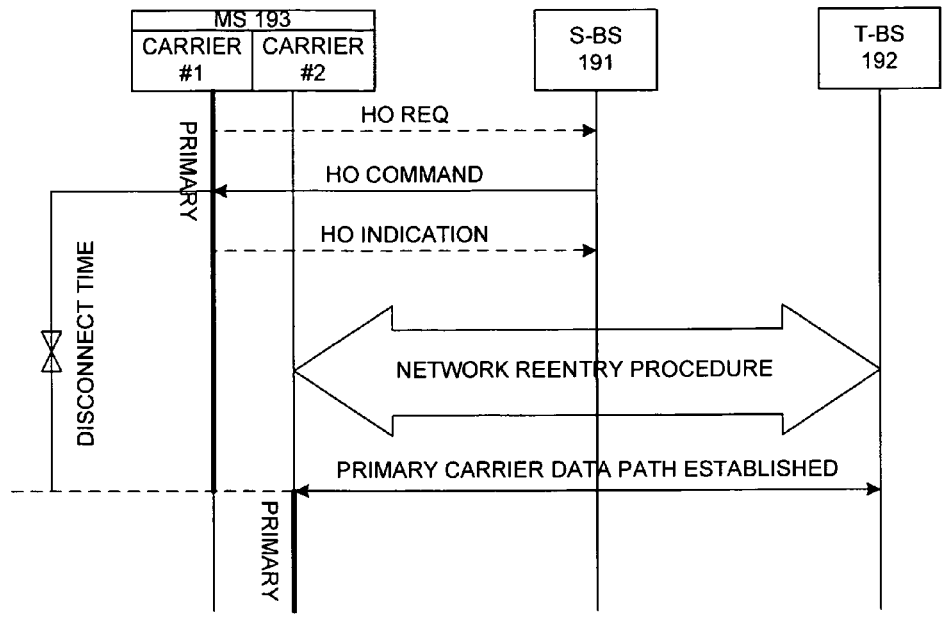
FIG. 20A is a message sequence chart of one embodiment of a multi-carrier inter-FA EBB handover procedure.

FIG. 20A is a more detailed message sequence chart of an inter-FA EBB handover procedure in multi-carrier wireless system 190. In an inter-FA EBB handover, the primary carrier frequency changes after network reentry. As illustrated in FIG. 20A, MS193 receives a handover command from S-BS191 via the primary carrier (carrier #1). MS193 then starts to perform network reentry with T-BS192 using the secondary carrier (carrier #2) while maintains connection with S-BS191 on the original primary carrier (carrier #1). A new primary carrier data path with T-BS192 is then established after network reentry and the secondary carrier (carrier #2) becomes the new primary carrier. S-BS191 also stops all DL/UL data transmission and resource allocation upon expiration of Disconnect Time or upon receiving a handover complete message from T-BS192, whichever comes first.

Figure 20B:
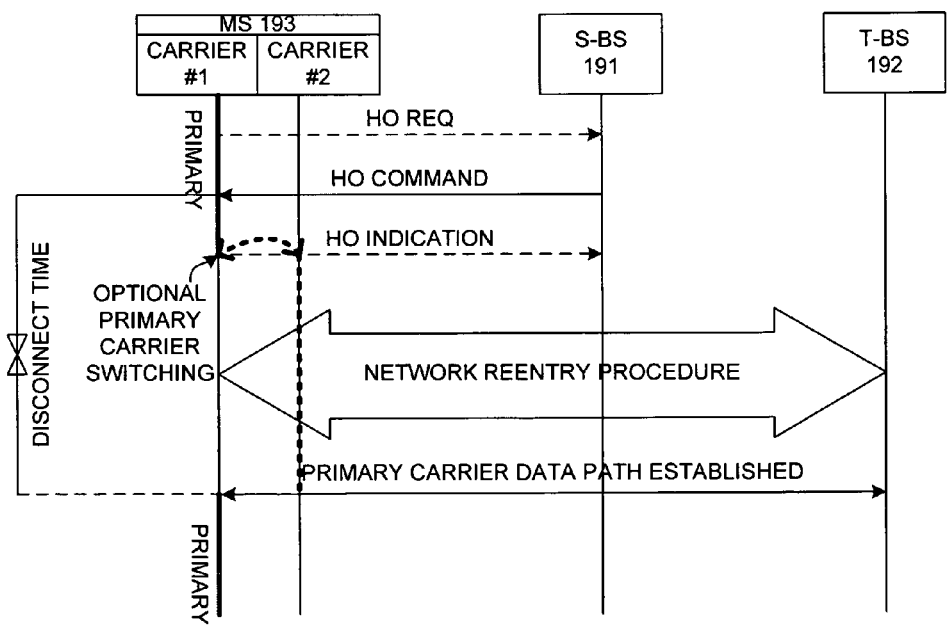
FIG. 20B is a message sequence chart of another embodiment of a multi-carrier intra-FA EBB handover procedure.

FIG. 20B is a more detailed message sequence chart of an intra-FA EBB handover procedure in multi-carrier wireless system 190. In an intra-FA EBB handover, the primary carrier frequency remains the same after network reentry. As illustrated in FIG. 20B, MS193 receives a handover command from S-BS191 via the primary carrier (carrier #1). Before performing network reentry, MS193 switches its primary carrier to the secondary carrier. MS193 then starts to perform network reentry with T-BS192 using the original primary carrier (carrier #1) while maintains connection with S-BS191 on the original secondary carrier (carrier #2). A new primary carrier data path with T-BS192 is then established after the network reentry and the original primary carrier (carrier #1) remains as the new primary carrier. Similar to the inter-FA handover in FIG. 20A, S-BS191 stops all DL/UL data transmission and resource allocation upon expiration of Disconnect Time or upon receiving a handover complete message from T-BS192, whichever comes first.

Figure 21:
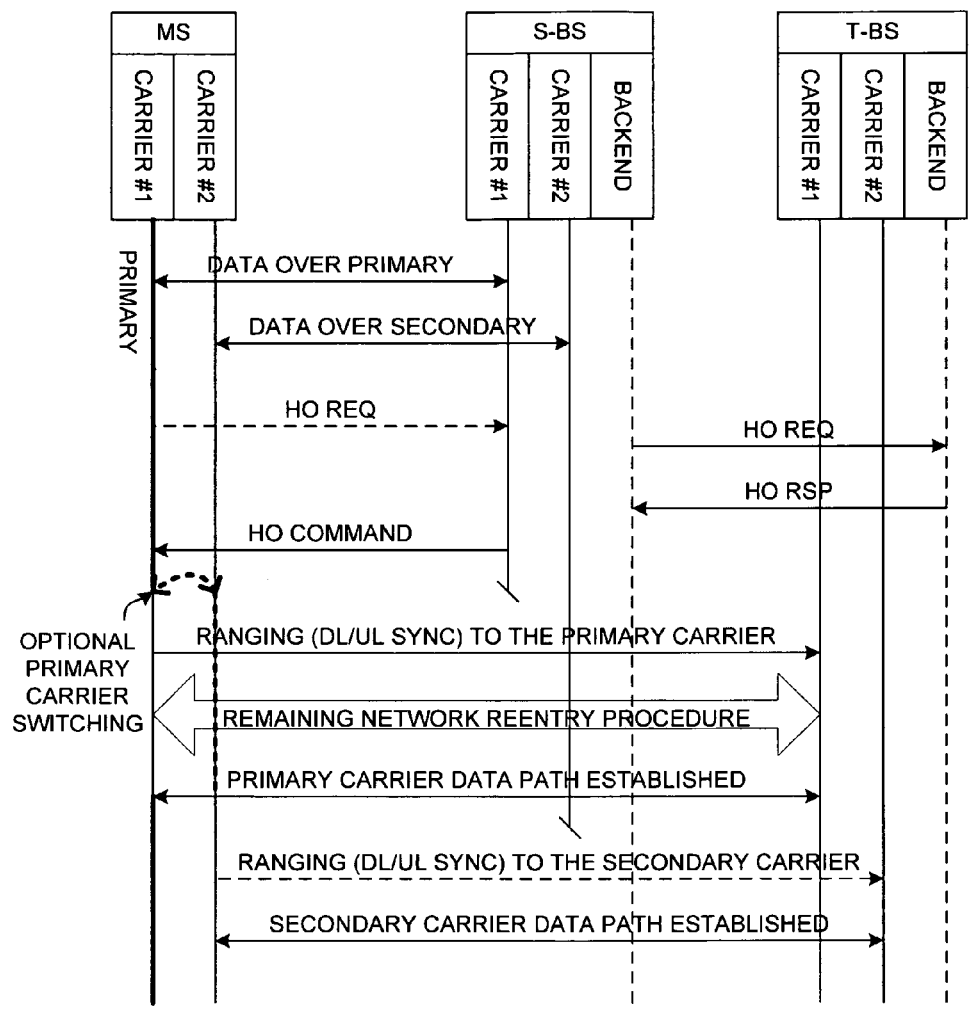
FIG. 21 is a message sequence chart of 2-to-2 carriers intra-FA EBB handover procedure.

FIG. 21 is a message sequence chart of a 2-to-2 carriers intra-FA EBB handover procedure. In a 2-to-2 carriers handover situation, a mobile station (MS) communicates with its serving base station (S-BS) over both a primary carrier (carrier #1) and a secondary carrier (carrier #2), and both serving carriers will be handed over to two target carriers after the completion of the 2-to-2 carriers handover operation. In MS-initiated handover, the MS and the S-BS exchanges handover request and command messages via the primary carrier. In BS-initiated handover, the MS receives handover command from the S-BS. Because multi-carrier handover is involved, the S-BS informs the T-BS for multiple carriers via backend, and receives a handover response back from the T-BS. The S-BS then forwards the information of target carrier assignment and configuration to the MS. The MS performs handover ranging (i.e. UL synchronization) with the T-BS on one carrier while maintaining data connection with the S-BS on the other carrier. If the primary carrier is used for handover ranging, then primary carrier switch is conducted optionally before such ranging. The MS then performs remaining network reentry procedure (i.e. key exchange, capability negotiation) with the T-BS and establishes a new connection to the target primary carrier. Optionally, handover ranging to the target secondary carrier may either be performed or skipped depending on the synchronization status and a new connection to the target secondary carrier is established. After the intra-FA handover, the original primary carrier remains as the new primary carrier.

Figure 22:
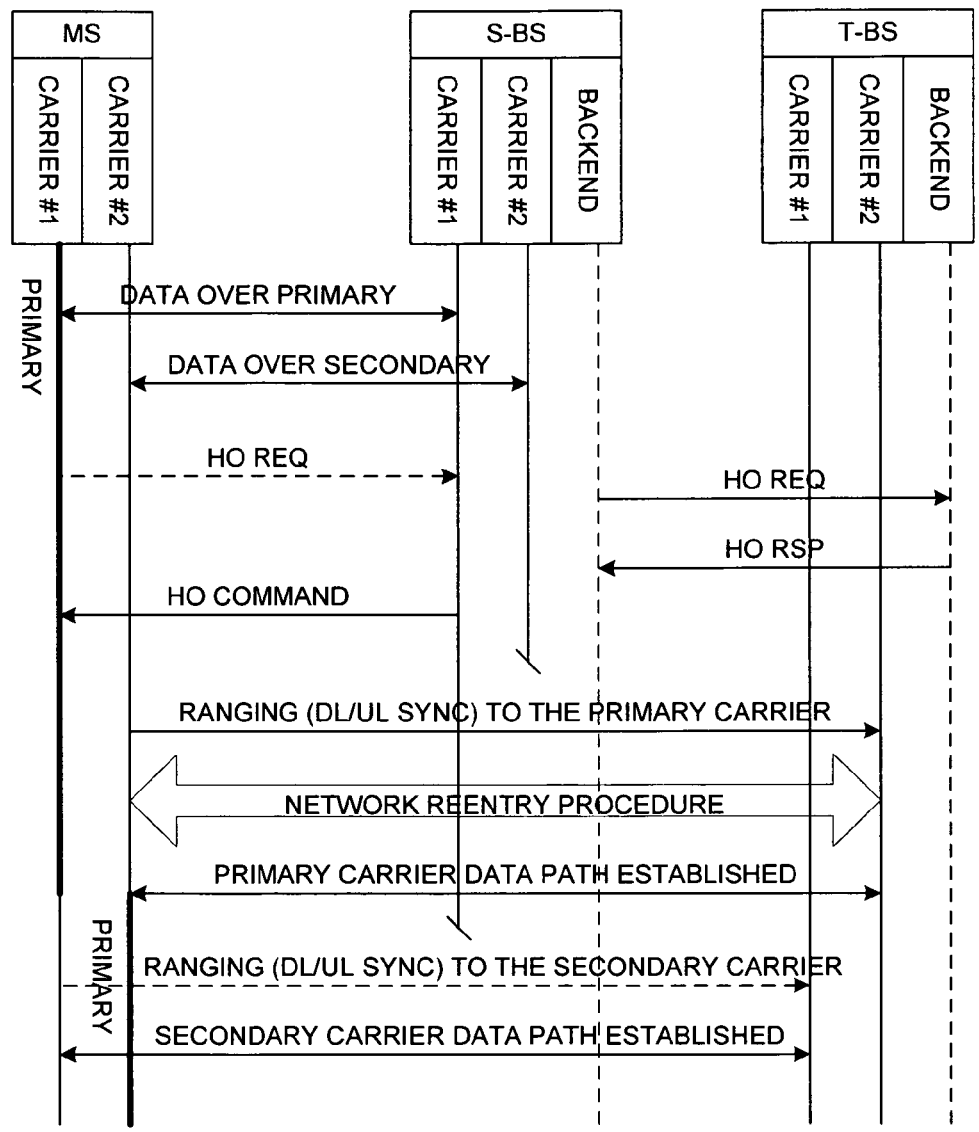
FIG. 22 is a message sequence chart of 2-to-2 carriers inter-FA EBB handover procedure.

FIG. 22 is a message sequence chart of a 2-to-2 carriers inter-FA EBB handover procedure. The inter-FA EBB handover procedure is very similar to the intra-FA EBB handover procedure described above with respect to FIG. 21. The difference is that the MS maintains connection with the S-BS on the primary carrier while performing handover ranging with the T-BS on the secondary carrier and thus no primary carrier switch is needed. After the inter-FA handover, the secondary carrier becomes the new primary carrier.

Figure 23:
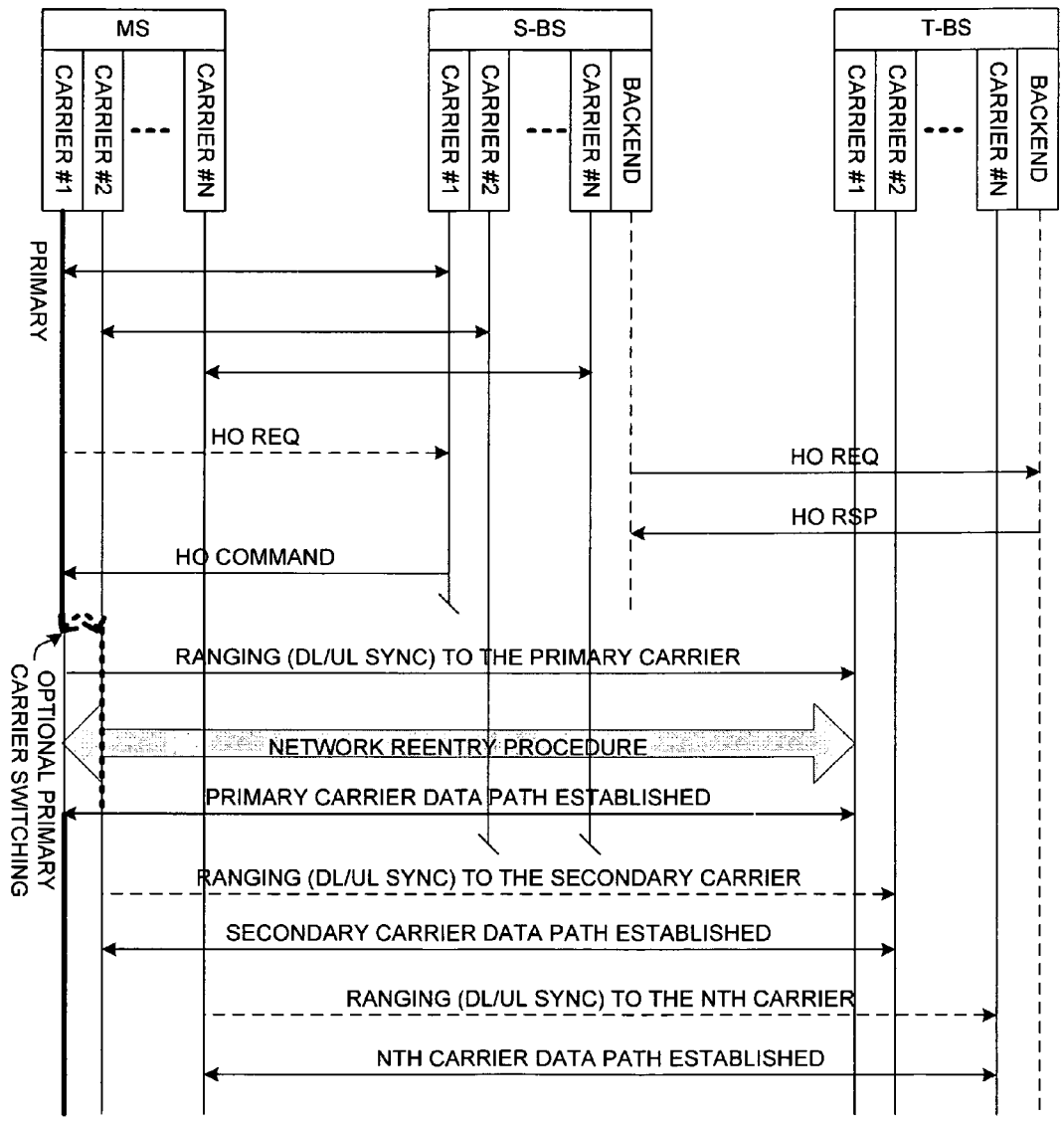
FIG. 23 is a message sequence chart of N-to-N carriers intra-FA EBB handover procedure.

FIG. 23 is a message sequence chart of an N-to-N carriers intra-FA EBB handover procedure. In an N-to-N carrier handover situation, a mobile station (MS) communicates with its serving base station (S-BS) over N multiple carriers (carrier #1-#N), and all N serving carriers will be handed over to N target carriers after the completion of the N-to-N carriers handover operation. The N-to-N carriers intra-FA EBB handover procedure is similar to the 2-to-2 carriers intra-FA EBB handover described above with respect to FIG. 21, and all carriers connecting to the serving BS are disconnected right after the target primary carrier is established.

Figure 24:
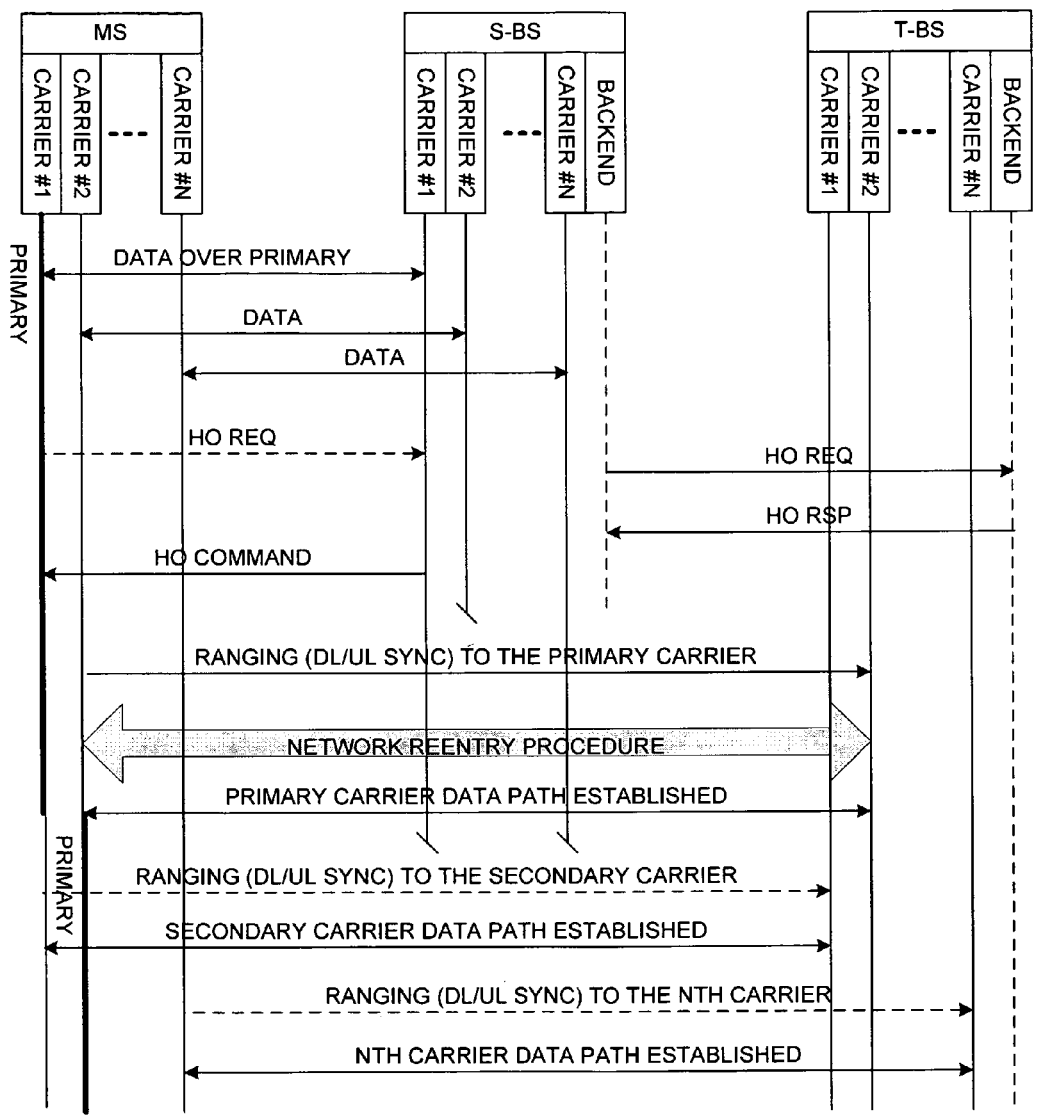
FIG. 24 is a message sequence chart of N-to-N carriers inter-FA EBB handover procedure.

FIG. 24 is a message sequence chart of an N-to-N carriers inter-FA EBB handover procedure. The N-to-N carriers inter-FA EBB handover procedure is similar to the 2-to-2 carriers inter-FA EBB handover described above with respect to FIG. 22, and all carriers connecting to the serving BS are disconnected right after the target primary carrier is established.

Figure 25:
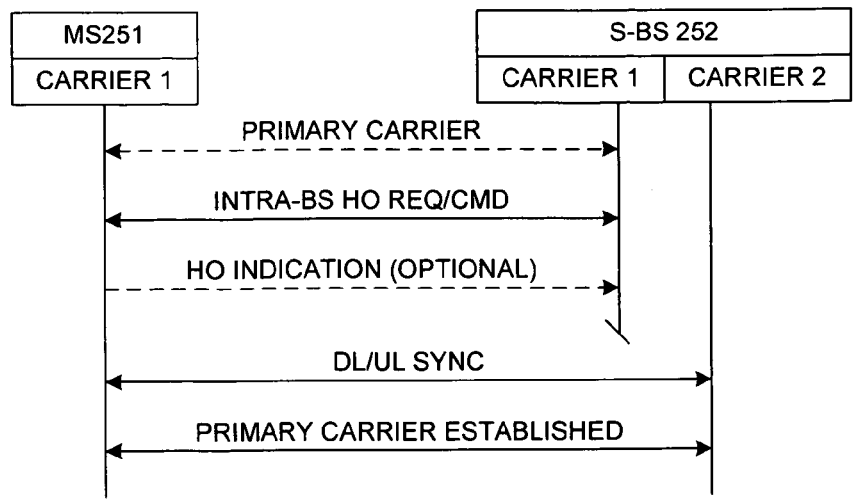
FIGS. 25-27 are message sequence charts of different embodiments of intra-BS handover procedure in a multi-carrier wireless system.
Figure 26:
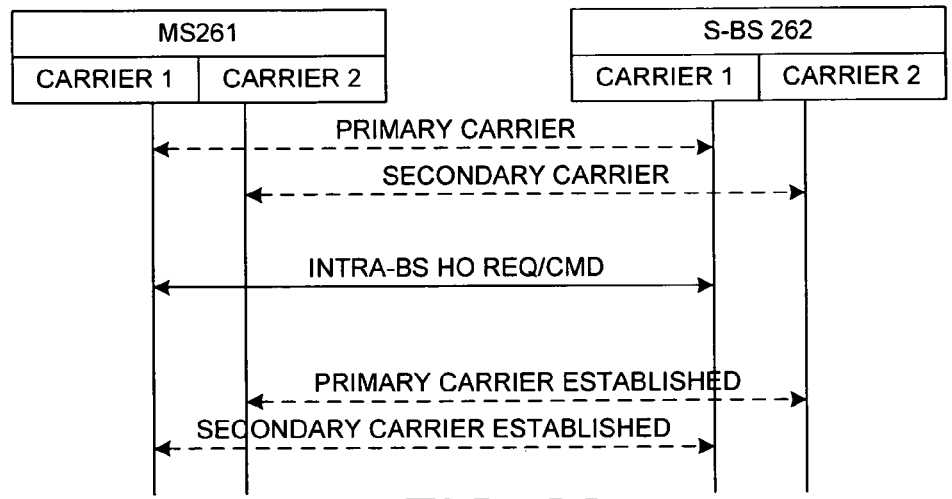
Figure 27:
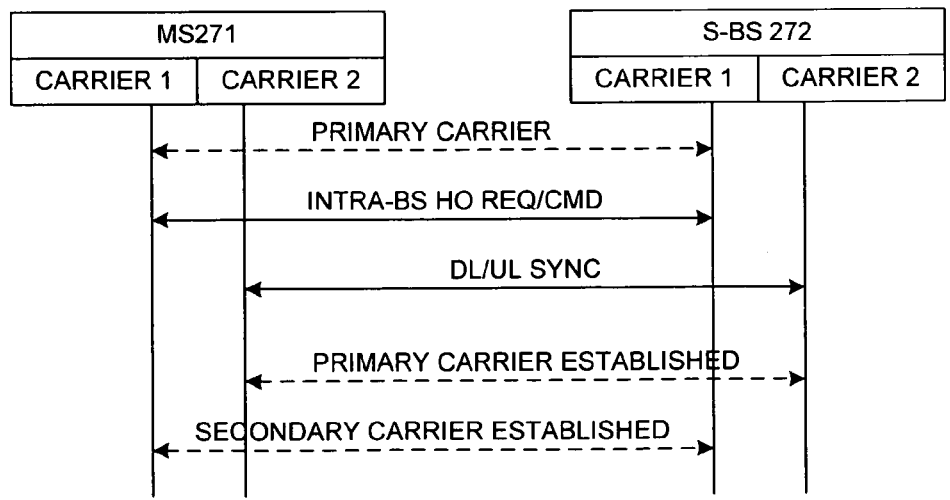

FIG. 25-27 are message sequence charts of different embodiments of intra-BS handover (sometimes also referred as primary carrier switching) procedure in a multi-carrier wireless system. To start the intra-BS handover operation, the MS requests or is requested by its serving BS to reallocate its primary carrier to another carrier of the same serving BS through intra-BS handover request and command message exchange. After intra-BS handover, the primary carrier is switched from one carrier frequency to another carrier frequency within the same serving BS.

In the example of FIG. 25, MS251 is a single-carrier mobile station. After intra-BS handover request (optional for MS-initiated handover) and command message exchange with S-BS252, MS251 disconnects the old primary carrier first, performs DL/UL synchronization, and then establishes a new primary carrier. In the example of FIG. 26, both primary carrier (carrier #1) and secondary carrier (carrier #2) are established between MS261 and S-BS262 before intra-BS handover. After intra-BS handover request (optional for MS-initiated handover) and command message exchange with S-BS262, the primary carrier and the secondary carrier simply switch (carrier #2 is the new primary carrier and carrier #1 is the new secondary carrier) without the need to perform any DL/UL synchronization. In the example of FIG. 27, MS271 supports two radio frequency carriers (carrier #1 and carrier #2), but only the primary carrier (carrier #1) is established with S-BS272. After intra-BS handover request (optional for MS-initiated handover) and command message exchange, MS271 performs DL/UL synchronization using a secondary carrier without disconnecting the original primary carrier. After a new primary carrier (carrier #2) is established, the original primary carrier (carrier #1) can either be configured into a new secondary carrier or be disconnected immediately.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method of operating a mobile station to scan neighboring base stations in a multi-carrier OFDMA wireless communications system, the method comprising:
    (a) determining one or more radio frequency carriers to be used for scanning, wherein the mobile station is communicating to a serving base station over a primary radio frequency carrier, and wherein the mobile station exchanges control messages with the serving base station over the primary radio frequency carrier; and
    (b) performing scanning over the determined one or more radio frequency carriers; wherein the scanning involves measuring the determined radio frequency carriers of a neighbor base station or the serving base station.

2. The method of claim 1, wherein the one or more determined radio frequency carriers comprises the primary radio frequency carrier, and wherein the mobile station maintains data communication with the serving base station on a secondary radio frequency carrier.

3. The method of claim 1, wherein the one or more determined radio frequency carriers comprises a secondary radio frequency carrier, and wherein the mobile station maintains data communication with the serving base station on the primary radio frequency carrier.

4. The method of claim 1, wherein the one or more determined radio frequency carriers comprises both the primary radio frequency carrier and one or more secondary radio frequency carriers.

5. The method of claim 1, wherein scanning involves measuring another radio frequency carrier of either a neighbor base station or the serving base station.

6. The method of claim 5, wherein the measuring comprises measurement of at least one of a radio signal strength, a carrier-to-interference noise ratio, and a round-trip delay.

7. A method of operating a mobile station to handover from a serving base station to a target base station in a multi-carrier OFDMA wireless communications system, the method comprising:
    (a) receiving a handover command from the serving base station via an original primary carrier;
    (b) performing synchronization procedure with the target base station using a secondary carrier without exchanging handover signaling messages with the serving base station over the secondary carrier;
    (c) disconnecting all connections on all carriers from the serving base station after the synchronization procedure; and
    (d) performing network reentry and thereby establishing data path with the target base station through a new primary carrier, wherein the network reentry is performed using the original primary carrier, wherein an uplink adjustment of the secondary carrier are reused by the original primary carrier for the network reentry, and wherein the original primary carrier becomes the new primary carrier.

8. The method of claim 7, wherein the network reentry in (d) is performed using the secondary carrier, and wherein the secondary carrier becomes the new primary carrier.

9. The method of claim 7, wherein the synchronization procedure comprises:
    performing downlink physical layer synchronization;
    acquiring network reentry related parameters; and
    performing ranging for uplink power/timing/frequency adjustments.

10. A method of operating a mobile station to handover from a serving base station to a target base station in a multi-carrier OFDMA wireless communications system, the method comprising:
    (a) receiving a handover command from the serving base station via a primary carrier, wherein the handover command comprises the target base station carrier assignment and configuration information;
    (b) performing ranging and network reentry with the target base station using a secondary carrier while maintaining communications with the serving base station on the primary carrier, wherein the network reentry is performed on a target primary carrier;
    (c) establishing a new primary carrier data path with the target base station, wherein the secondary carrier becomes the new primary carrier, wherein the new primary carrier data path is established to the target primary carrier, and wherein a second data path is established to a target secondary carrier; and
    (d) disconnecting all connections on all carriers from the serving base station after network reentry is completed.

11. The method of claim 10 further comprising:
    performing ranging with the target base station on the target secondary carrier.

12. A method of operating a mobile station to handover from a serving base station to a target base station in a multi-carrier OFDMA wireless communications system, the method comprising:
    (a) receiving a handover command from the serving base station via a primary carrier, wherein the handover command comprises the target base station carrier assignment and configuration information;
    (b) switching the primary carrier to another carrier;
    (c) performing ranging and network reentry with the target base station using the primary carrier while maintaining communications with the serving base station on a secondary carrier, wherein the network reentry is performed on a target primary carrier;
    (d) establishing a new primary carrier data path with the target base station, wherein the primary carrier remains as the new primary carrier, wherein the new primary carrier data path is established to the target primary carrier, and wherein a second data path is established to a target secondary carrier; and
    (e) disconnecting all connections on all carriers from the serving base station after network reentry is completed.

13. The method of claim 12 further comprising:
    performing ranging with the target base station on the target secondary carrier.

14. A method of operating a mobile station to handover from a serving base station to a target base station in a wireless communications system, the method comprising:
    (a) transmitting a handover request for requesting a plurality of unavailable intervals to the serving base station via a primary carrier, wherein the length of each unavailable interval and the duration of the unavailable intervals is negotiated between the mobile station and the serving base station during handover preparation phase;
    (b) performing ranging and network reentry with the target base station within the requested unavailable intervals such that communication is maintained with the serving base station;
    (c) establishing a new primary carrier data path with the target base station; and
    (d) maintaining communication with the serving base station until the new data path with the target base station is established.

15. The method of claim 14, wherein the network entry is performed using a secondary carrier, and wherein the secondary carrier becomes the new primary carrier.

16. The method of claim 14, wherein the network entry is performed using the primary carrier, and wherein the primary carrier remains as the new primary carrier.

17. A method of operating a mobile station to handover from one carrier to another carrier within a serving base station in a multi-carrier OFDMA wireless communications system, the method comprising:
   (a) establishing data connections with the serving base station over an original primary carrier and a secondary carrier;
   (b) receiving an intra-BS handover command from the serving base station; and
   (c) establishing a new primary carrier data path with the same serving base station over the secondary carrier, wherein the original primary carrier is either disconnected or reconfigured into a new secondary carrier after the new primary carrier is established.

18. The method of claim 17, wherein the new primary carrier is established after performing ranging using the secondary carrier.

19. The method of claim 17, wherein the secondary carrier exists before the handover procedure, and wherein the new primary carrier is established using the secondary carrier without performing ranging.

* * * * *